United States Patent
Tamir et al.

(10) Patent No.: US 11,526,990 B1
(45) Date of Patent: Dec. 13, 2022

(54) COMPUTER SYSTEMS AND COMPUTER-IMPLEMENTED METHODS FOR RAPID DIAGNOSTIC TEST RESULT INTERPRETATION PLATFORM UTILIZING COMPUTER VISION

(71) Applicant: Bio-Marketing-T, Ltd. (BMT), Or-Akiva (IL)

(72) Inventors: Roey Tamir, Or-Akiva (IL); Idan Tamir, Or-Akiva (IL)

(73) Assignee: BIO-MARKETING-T, LTD. (BMT), Or-Akiva (IL)

( * ) Notice: Subject to any disclaimer, the term of this patent is extended or adjusted under 35 U.S.C. 154(b) by 0 days.

(21) Appl. No.: 17/885,218

(22) Filed: Aug. 10, 2022

(51) Int. Cl.
G06T 7/00 (2017.01)
G06V 10/764 (2022.01)

(52) U.S. Cl.
CPC .......... G06T 7/0014 (2013.01); G06V 10/764 (2022.01); G06T 2207/20084 (2013.01); G06T 2207/30004 (2013.01)

(58) Field of Classification Search
CPC ......... G06T 7/0014; G06T 2207/20084; G06T 2207/30004; G06V 10/764
See application file for complete search history.

(56) References Cited

U.S. PATENT DOCUMENTS

| 9,818,023 | B2 | 11/2017 | Shor et al. | |
|---|---|---|---|---|
| 10,902,951 | B2 * | 1/2021 | Pulitzer | G01N 33/00 |
| 10,991,096 | B2 | 4/2021 | Adir et al. | |
| 11,081,232 | B2 | 8/2021 | Aysin et al. | |
| 11,216,683 | B2 | 1/2022 | Ji et al. | |
| 11,302,448 | B1 * | 4/2022 | Jain | G16H 10/60 |
| 2018/0021771 | A1 | 1/2018 | Tamir | |
| 2019/0164278 | A1 | 5/2019 | Abramoff et al. | |
| 2019/0362841 | A1 * | 11/2019 | Aysin | G16H 40/60 |
| 2020/0126226 | A1 * | 4/2020 | Adiri | G06T 7/0012 |
| 2021/0012166 | A1 * | 1/2021 | Braley | G06T 7/74 |

(Continued)

FOREIGN PATENT DOCUMENTS

WO 2021180442 A1 9/2021

OTHER PUBLICATIONS

Amin et al., "Comparative Study of Augmented Reality Sdk's," International Journal on Computational Science & Applications, Feb. 2015, vol. 5, No. 1, pp. 11-26.

(Continued)

Primary Examiner — Ping Y Hsieh
(74) Attorney, Agent, or Firm — Greenberg Traurig, LLP

(57) ABSTRACT

Disclosed are computer systems and computer-implemented methods for rapid diagnostic test result interpretation platform employing computer vision. The system can visually analyze the test device in real-time by receiving image streams of the test device from the camera system. The detection system can be used to identify the test result in the test region. In some embodiments, the test result is binary (e.g., Positive/Negative). In some embodiments, the test result is in semi-quantitative formats (e.g., 1-10). The test result can be sent back to the user, operator, HMO, or physician for further confirmation, recording, and medical treatment decision/follow-up. The detection system can close the loop between the user of the test device and the HMO/physician for recording of the test result and the provision of medical treatment/follow-up.

30 Claims, 18 Drawing Sheets

(56) References Cited

U.S. PATENT DOCUMENTS

| | | | |
|---|---|---|---|
| 2021/0057099 A1* | 2/2021 | Neumann | G16H 50/20 |
| 2021/0342836 A1* | 11/2021 | Cella | H04L 67/12 |
| 2022/0018736 A1* | 1/2022 | Tamir | G01N 33/54388 |
| 2022/0087645 A1* | 3/2022 | Melapudi | A61B 8/5223 |

OTHER PUBLICATIONS

Cai et al., "YOLObile: Real-Time Object Detection on Mobile Devices via Compression-Compilation Co-Design," ArXiv:2009.0569, Dec. 2, 3002, 10 pages.

Fletcher et al., "Development of Smart Phone Tools for Printed Diagnostics: Challenges and Solutions," IEEE 2016 Global Humanitarian Technology Conference (GHTC), 2016, pp. 701-708.

Gammeter et al., "Server-Side Object Recognition and Client-Side Object Tracking for Mobile Augmented Reality," 2010 IEEE Computer Society Conference on Computer Vision and Pattern Recognition—Workshops, 2010, No. pp. 1-8.

Happel et al., "The Design and Evolution of Modular Neural Network Architectures," Neural Networks, 1994, No. 7, pp. 985-1004.

Khan et al., "A Survey of the Recent Architectures of Deep Convolutional Neural Networks," Artificial Intelligence Review, 2020, vol. 53, No. 8, 70 pages.

Liu et al., "Edge Assisted Real-Time Object Detection for Mobile Augmented Reality," The 25th Annual International Conference on Mobile Computing and Networking, 2019, pp. 1-16.

Martinez-Alpiste et al., "Smartphone-Based Real-Time Object Recognition Architecture for Portable and Constrained Systems," Journal of Real-Time Image Processing, 2022, vol. 19, No. 1, pp. 103-115.

Michaels et al., "A Goal-Driven Modular Neural Network Predicts Parietofrontal Neural Dynamics during Grasping," Proceedings of the National Academy of Sciences, Dec. 15, 2020, vol. 117, No. 50, pp. 32124-32135.

Pilavaki et al., "Optimized Lateral Flow Immunoassay Reader for the Detection of Infectious Diseases in Developing Countries," Sensors, 2017, vol. 17, 11 pages.

Wang et al., "Joint Server Assignment and Resource Management for Edge-Based MAR System," IEEE/ACM Transactions on Networking, Oct. 2020, vol. 28, No. 5, pp. 2378-2391.

Yan et al., "Self-Supervised Learning to Detect Key Frames in Videos," Sensors, Dec. 4, 2020, vol. 20, 18 pages.

Zhang et al., "On the Networking Challenges of Mobile Augmented Reality," Proceedings of the Workshop on Virtual Reality and Augmented Reality Network, Aug. 25, 2017, pp. 24-29.

Estrada et al., "Deep-Learning-Incorporated Augmented Reality Application for Engineering Lab Training," Applied Sciences, 19 pages (2022).

Anwar et al., "Medical Image Analysis using Convolutional Neural Networks: A Review," ResearchGate, 16 pages (2018).

* cited by examiner

COMPUTER SYSTEMS AND COMPUTER-IMPLEMENTED METHODS FOR RAPID DIAGNOSTIC TEST RESULT INTERPRETATION PLATFORM UTILIZING COMPUTER VISION

FIELD OF THE DISCLOSURE

Generally, the present disclosure is directed to computer-implemented methods and computer systems configured for rapid diagnostic test result interpretation platform employing computer vision.

BACKGROUND

The use of lateral flow-based In-Vitro Rapid Diagnostic Test (IV-RDT) in disease diagnosis has greatly expanded, emphasized by the need for large population self-screening during the COVID-19 pandemic.

SUMMARY

In some aspects, the techniques described herein relate to a method including: receiving, by a processor, from a camera, a first image stream of a test device, the test device including a test region displaying a visual indicator; applying, by the processor, at least one computer vision technique of a deep learning module to: identify a plurality of device features of the test device in the first image stream; and classify, based on the plurality of device features of the test device, at least one first image in the first image stream to at least one first reference image in a corpus of reference images of the test device; selecting, by the processor, based on the at least one first reference image, at least one imaging directing command for the camera to capture a second image stream, wherein the second image stream includes the test region; instructing, by the processor, to implement the at least one imaging directing command to automatically generate the second image stream; receiving, by the processor, the second image stream from the camera adjusted with the at least one imaging directing command; applying, by the processor, the at least one computer vision technique of the deep learning module to: identify a plurality of device features of the test region in the second image stream; and classify, based on the plurality of device features of the test region, at least one second image in the second image stream to at least one second reference image in a corpus of reference images of the test region; and identifying, by the processor, based on the at least one second reference image, a test result based on the visual indicator in the at least one second image.

In some aspects, the techniques described herein relate to a method, further including: transmitting, by the processor, a user identification to a user device including the camera; maintaining, by the processor, a connection to the user device based on the user identification; and receiving, by the processor, the first image stream and the second image stream via the connection.

In some aspects, the techniques described herein relate to a method, wherein the plurality of device features is a structural feature.

In some aspects, the techniques described herein relate to a method, wherein the at least one computer vision technique of the deep learning module include at least one modular neural network, each modular neural network including at least one convolutional neural network input.

In some aspects, the techniques described herein relate to a method, wherein the at least one convolutional neural network identifies the test region in the at least one first image in the first image stream.

In some aspects, the techniques described herein relate to a method, wherein the at least one modular neural network identifies at least one candidate imaging directing command; and wherein the at least one convolutional neural network selects the at least one imaging directing command of the at least one candidate imaging directing command.

In some aspects, the techniques described herein relate to a method, further including: generating, by the processor, based on imaging directing metadata associated with the at least one first reference image, the at least one imaging directing command for the camera to capture the second image stream, wherein the second image stream includes the test region.

In some aspects, the techniques described herein relate to a method, wherein instructing to implement the at least one imaging directing command includes: transmitting, by the processor, the at least one imaging directing command to the camera to cause the camera to automatically generate the second image stream based on the at least one imaging directing command.

In some aspects, the techniques described herein relate to a method, wherein instructing to implement the at least one imaging directing command includes: transmitting, by the processor, to a user device including the camera, the at least one imaging directing command including augmented reality instructions for the user device to overlay on the first image stream to direct a user to reposition the camera to capture the test device.

In some aspects, the techniques described herein relate to a method, further including: storing, by the processor, the test result; and transmitting, by the processor, to an administrator device, the test result for display.

In some aspects, the techniques described herein relate to a system including: a processor configured to: receive a first image stream of a test device from a camera, the test device including a test region displaying a visual indicator; apply at least one computer vision technique of a deep learning module to: identify a plurality of device features of the test device in the first image stream; and classify, based on the plurality of device features of the test device, at least one first image in the first image stream to at least one first reference image in a corpus of reference images of the test device; select, based on the at least one first reference image, at least one imaging directing command for the camera to capture a second image stream, wherein the second image stream includes the test region; instruct to implement the at least one imaging directing command to automatically generate the second image stream; receive the second image stream from the camera adjusted with the at least one imaging directing command; apply the at least one computer vision technique of the deep learning module to: identify a plurality of device features of the test region in the second image stream; and classify, based on the plurality of device features of the test region, at least one second image in the second image stream to at least one second reference image in a corpus of reference images of the test region; and identify, based on the at least one second reference image, a test result based on the visual indicator in the at least one second image.

In some aspects, the techniques described herein relate to a system, wherein the processor is further configured to: transmit a user identification to a user device including the camera; maintain a connection to the user device based on the user identification; and receive the first image stream and the second image stream via the connection.

In some aspects, the techniques described herein relate to a system, wherein the plurality of device features is a structural feature.

In some aspects, the techniques described herein relate to a system, wherein the at least one computer vision technique of the deep learning module include at least one modular neural network communicating with at least one convolutional neural network input.

In some aspects, the techniques described herein relate to a system, wherein the at least one convolutional neural network identifies the test region in the at least one first image in the first image stream.

In some aspects, the techniques described herein relate to a system, wherein the at least one computer vision technique of the deep learning module identifies at least one candidate imaging directing command; and wherein the at least one convolutional neural network selects the at least one imaging directing command of the at least one candidate imaging directing command.

In some aspects, the techniques described herein relate to a system, wherein the processor is further configured to: generate, based on imaging directing metadata associated with the at least one second reference image, the at least one imaging directing command for the camera to capture the second image stream, wherein the second image stream includes the test region.

In some aspects, the techniques described herein relate to a system, wherein to instruct to implement the at least one imaging directing command, the processor is further configured to: transmit the at least one imaging directing command to the camera to cause the camera to automatically generate the second image stream based on the at least one imaging directing command.

In some aspects, the techniques described herein relate to a system, wherein to instruct to implement the at least one imaging directing command, the processor is further configured to: transmit, to a user device including the camera, the at least one imaging directing command including augmented reality instructions for the user device to overlay on the first image stream to direct a user to reposition the camera to capture the test device.

In some aspects, the techniques described herein relate to a system, wherein the processor is further configured to: store the test result; and transmit, to an administrator device, the test result for display.

In some aspects, the techniques described herein relate to a method including: identifying, by a processor of a user device, from a camera of the user device, a first image stream of a test device, the test device including a test region displaying a visual indicator; applying, by the processor, at least one computer vision technique of a deep learning module to: identify a plurality of device features of the test device in the first image stream; transmit, to a server including a corpus of reference images of the test device, the plurality of device features of the test device; receive, from the server, at least one first reference image in the corpus of reference images; and classify, based on the plurality of device features, at least one first image in the first image stream to the at least one first reference image; selecting, by the processor, based on the at least one first reference image, at least one imaging directing command for the camera to capture a second image stream, wherein the second image stream includes the test region; instructing, by the processor, to implement the at least one imaging directing command to automatically generate the second image stream; identifying, by the processor, the second image stream from the camera adjusted with the at least one imaging directing command; applying, by the processor, the at least one computer vision technique of the deep learning module to: identify a plurality of device features of the test region in the second image stream; transmit, to the server including a corpus of reference images of the test region, the plurality of device features of the test region; receive, from the server, at least one second reference image in the corpus of reference images of the test region; and classify, based on the plurality of device features of the test region, at least one second image in the second image stream to the at least one second reference image; and identifying, by the processor, based on the at least one second reference image, a test result based on the visual indicator in the at least one second image.

In some aspects, the techniques described herein relate to a method, further including: receiving, by the processor, a user identification from the server; maintaining, by the processor, a connection to the server based on the user identification; and transmitting, by the processor, to the server via the connection, the plurality of device features of the test device and the plurality of device features of the test region.

In some aspects, the techniques described herein relate to a method, wherein the plurality of device features is a structural feature.

In some aspects, the techniques described herein relate to a method, wherein the at least one multi agent system include at least one deep learning model and at least one augmented reality model.

In some aspects, the techniques described herein relate to a method, wherein the at least one convolutional neural network identifies the test region in the at least one first image in the first image stream.

In some aspects, the techniques described herein relate to a method, wherein the at least one computer vision technique of the deep learning module identifies at least one candidate imaging directing command; and wherein the at least one convolutional neural network selects the at least one imaging directing command of the at least one candidate imaging directing command.

In some aspects, the techniques described herein relate to a method, further including: receiving, by the processor, from the server, imaging directing metadata associated with the at least one second reference image; and generating, by the processor, based on the imaging directing metadata associated with the at least one second reference image, the at least one imaging directing command for the camera to capture the second image stream, wherein the second image stream includes the test region.

In some aspects, the techniques described herein relate to a method, wherein instructing to implement the at least one imaging directing command includes: generating, by the processor, the at least one imaging directing command for the camera to automatically generate the second image stream based on the at least one imaging directing command.

In some aspects, the techniques described herein relate to a method, wherein instructing to implement the at least one imaging directing command includes: causing, by the processor, the user device to display the at least one imaging directing command including augmented reality instructions overlaid on the image stream to direct a user to reposition the camera to capture the test device.

In some aspects, the techniques described herein relate to a method, further including: storing, by the processor, the test result; and transmitting, by the processor, to an administrator device, the test result for display.

Figure 1:
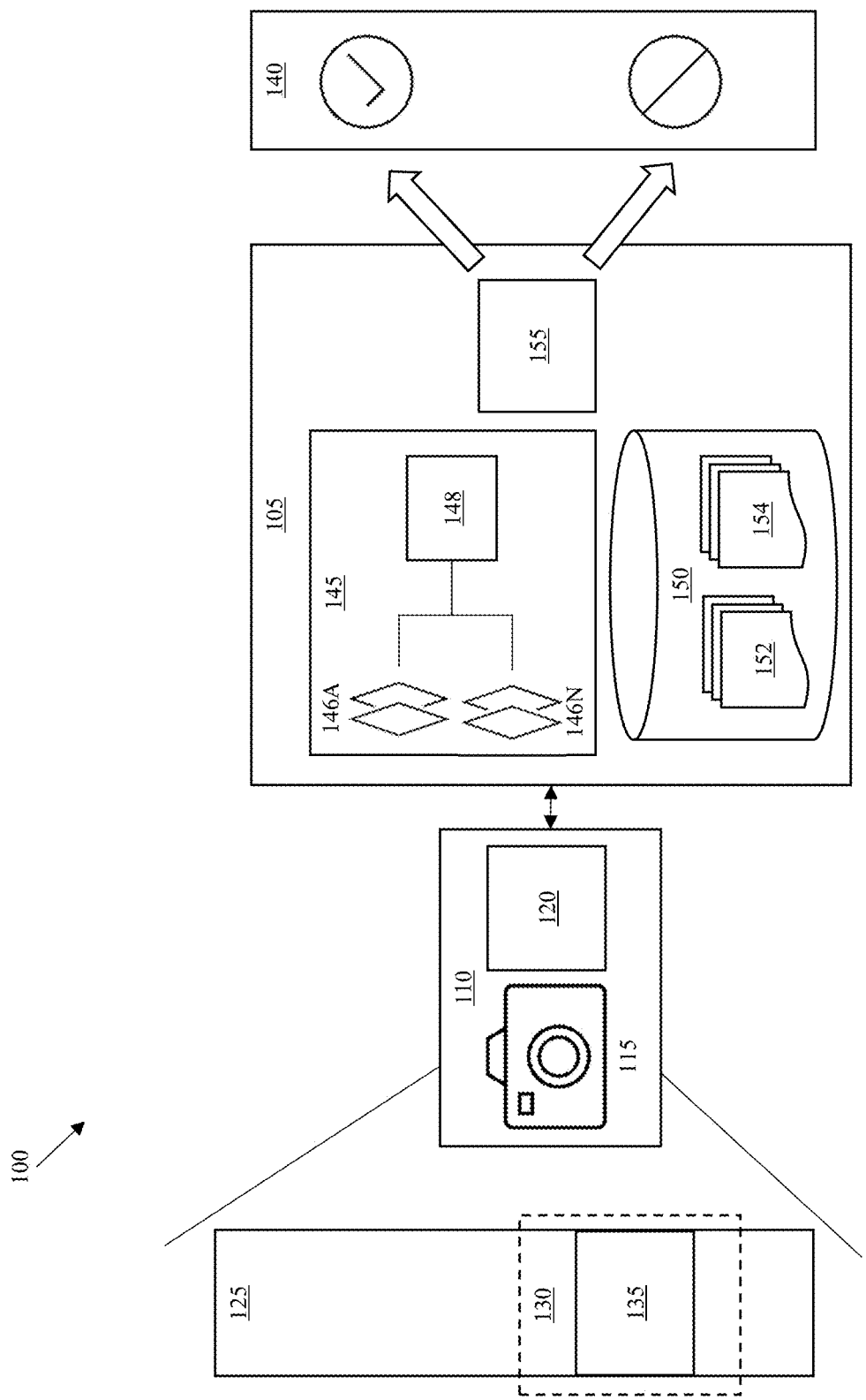
FIGS. 1-16 are representative of some exemplary aspects of the present disclosure in accordance with at least some principles of at least some embodiments of the present disclosure.

To facilitate understanding, identical reference numerals have been used, where possible, to designate identical elements that are common to the figures. The figures are not drawn to scale and may be simplified representations for the sake of clarity. It is contemplated that elements and features of one embodiment may be beneficially incorporated in other embodiments without further recitation.

DETAILED DESCRIPTION

Among those benefits and technical solutions that have been disclosed, other objects and advantages of this disclosure can become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although they may. Thus, as described below, various embodiments of the disclosure may be readily combined, without departing from the scope or spirit of the disclosure. Further, when a particular feature, structure, or characteristic is described in connection with an implementation, it is submitted within the knowledge of one skilled in the art to effect such feature, structure, or characteristic in connection with other implementations whether or not explicitly described herein.

The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action is occurring. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" means that events and/or actions can be triggered and/or occur without any human intervention. In some embodiments, events and/or actions in accordance with the present disclosure can be happening in real-time and/or based on a predetermined periodicity of at least one of: nanosecond, several nanoseconds, microsecond, several microseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, the inventive specially programmed computing systems with associated devices are configured to operate in the distributed network environment, communicating over a suitable data communication network (e.g., the Internet, etc.) and utilizing at least one suitable data communication protocol (e.g., IPX/SPX, X.25, AX.25, AppleTalk™, TCP/IP (e.g., HTTP), etc.). Of note, the embodiments described herein may, of course, be implemented using any appropriate hardware and/or computing software language. In this regard, those of ordinary skill in the art are well versed in the type of computer hardware that may be used, the type of computer programming techniques that may be used (e.g., object-oriented programming), and the type of computer programming languages that may be used (e.g., C++, Objective-C, Swift, Java, Javascript). The aforementioned examples are, of course, illustrative and not restrictive.

As used herein, the terms "image(s)" and "image data" are used interchangeably to identify data representative of visual content which includes, but not limited to, images encoded in various computer formats (e.g., ".jpg", ".bmp," etc.), streaming video based on various protocols (e.g., Real-time Streaming Protocol (RTSP), Real-time Transport Protocol (RTP), Real-time Transport Control Protocol (RTCP), etc.), recorded/generated non-streaming video of various formats (e.g., ".mov," ".mpg," ".wmv," ".avi," ".flv," ect.), and real-time visual imagery acquired through a camera application on a mobile device.

The material disclosed herein may be implemented in software or firmware or a combination of them or as instructions stored on a machine-readable medium, which may be read and executed by at least one processor. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the at least one processor may be implemented as a Complex Instruction Set Computer (CISC) or Reduced Instruction Set Computer (RISC) processors; x86 instruction set compatible processors, multi-core, or any other microprocessor, graphics processing unit (GPU), or central processing unit (CPU). In various implementations, the at least one processor may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

As used herein, the term "user" shall have a meaning of at least one user.

In some embodiments, the exemplary inventive computing device may be configured to be utilized for various goals, such as, without limitation, computer vision, image-based recommended positioning of mobile device cameras and applications, etc. In some embodiments, exemplary cameras may be either video cameras or digital stills cameras. In some embodiments, the exemplary cameras may be configured to work on the basis of sending analogue and/or digital signals to at least one storage device that may reside within at least one of: a desktop computer, laptop computer, or an output device, such as, without limitation, VR glasses, lens, smart watch, and/or a mobile device's screen.

In some embodiments, as detailed herein, an exemplary inventive computing device of the present disclosure may be programmed/configured to process visual feeds from various visual recording devices (such as, without limitations, mobile-device cameras, computer cameras, display screens, or any other cameras of similar purposes) to detect, recognize and track (e.g., in real-time) a test device of that appears in visual recording(s) at one time and/or over a period of time. In some embodiments, the exemplary inventive computing device may be configured to be utilized for various goals, such as, without limitation, computer vision, positioning-based recommendations commands in applications, etc. In some embodiments, exemplary cameras may be either video cameras or digital stills cameras. In some embodiments, the exemplary cameras may be configured to work on the basis of sending analogue and/or digital signals to at least one storage device that may reside within at least one of: a desktop computer, laptop computer, or an output device, such as, without limitation, VR glasses, lens, smart watch, and/or a mobile device.

In some embodiments, the exemplary inventive process of detecting, recognizing and tracking of one or more test devices over time is agnostic to whether visual recording(s) would have been obtained from the same or different recording devices at the same or different locations.

In some embodiments, the exemplary inventive computing device configured to detect, recognize and track one or more test regions of one or more test devices may rely on one or more centralized databases (e.g., data center). For example, the exemplary inventive computing device may be configured to extract feature input(s) for each test device that can be utilized to identify/recognize a particular test region or test result. In some embodiments, the exemplary inventive computing device may be configured to improve the detection by training itself based on a single image/s for test result identification or on a collection of video frames or videos taken in different conditions. In some embodiments, for example in mobile (e.g., smartphone) applications configured/programmed to offer a video communication capability having elements of augmented reality, the exemplary inventive computing device may be configured to detect, in real-time, one or more test devices based at least in part on a single frame or a series of frames without saving a state of recognition.

In some embodiments, the exemplary inventive computing device may be configured to utilize one or more techniques to for test device identification and test region tracking as detailed herein. In some embodiments, the exemplary inventive computing device may be configured to further utilize techniques that may allow to identify the test region in image frames.

In some embodiments, the exemplary inventive computing device may be configured to assist in medical testing purposes, such as, without limitation, to determine/estimate and track a test result of patients; to obtain feedback about test devices; tracking patients' conditions for medical and preventive purposes (e.g., monitoring diseases); suitable applications in statistics; suitable applications in sociology, etc. In some embodiments, the exemplary inventive computing device may be configured to assist in entertaining or/and educational purposes. For example, exemplary electronic content in mobile and/or computer-based applications may be dynamically adjusted and/or triggered based, at least in part, on the detected test devices. In some embodiments, illustrative examples of such dynamically adjusted/triggered electronic content may be one or more of visual masks and/or visual/audio effects (such as color, shape, size, etc.), which may be applied to test device images in an exemplary video stream. In some embodiments, the illustrative augmented content may be dynamically generated by the exemplary inventive computing device and consist of at least one of commands, suggestion(s), fact(s), image(s), etc.

In some embodiments, the exemplary inventive computing device may be configured to utilize raw video or image (e.g., screenshot) input/data from any type of known camera(s), including both analogue and digital ones.

In some embodiments, the exemplary inventive computing device may be configured to utilize morphable three-dimensional test device images which may be trained to produce meta-parameters (such as, without limitation, coefficient(s) defining a deviation of a test device from a mean shape; coefficient(s) defining test regions and/or test results, camera position, and/or head position, etc.).

In some embodiments, the exemplary inventive computing device may be configured to identify a test result based on a single frame as the baseline; while, having several frames may improve quality of detection. In some embodiments, the exemplary inventive computing device may be configured to estimate more refined pattern(s) in test results, hence enable use of lower resolution of cameras (e.g., mobile or web cameras, etc.).

In some embodiments, an exemplary inventive computing device or system may be configured to directly connect to an existing camera (e.g., mobile, computer-based, or other) or be operationally and remotely connected. In some embodiments, the exemplary inventive computing device or system may be configured to include a specifically programmed inventive data processing module that may be configured to obtain the video input from one or more cameras. For example, the specifically programmed inventive data processing module may be configured to determine source(s) of input video data, a need to transcode to a different format, or perform any other suitable adjustment so that video input may be available for processing in accordance with the principles of the present disclosure. In some embodiments, the input image data (e.g., input video data) may include any appropriate type of source for video contents and may contain various video sources. In some embodiments, the contents from the input video (e.g., the video stream of FIG. 1) may include both video data and metadata. A single picture may also be included in a frame. In some embodiments, the specifically programmed inventive data processing module may be configured to decode, in real-time, the video input and separate it into frames. In some embodiments, an exemplary input video stream captured by the exemplary camera (e.g., a front camera of a mobile personal smartphone) may be divided into frames. For example, a typical movie sequence is an interleaved format of a number of camera shots, and a camera take is a continuously recorded performance with a given camera setup. Camera registration, as used herein, may refer to registration of different cameras capturing video, image, or screen frames in a video or image sequence/stream. The concept of camera registration is based on the camera takes in reconstruction of video edits. A typical video sequence is an interleaved format of a number of camera shots, and a camera take is a continuously recorded performance with a given camera setup. By registering each camera from the incoming video frames, the original interleaved format can be separated into a number of sequences, with each corresponding to a registered camera that is aligned to the original camera setup.

In some embodiments, the specifically programmed inventive data processing module may be configured to process each frame or a series of frames utilizing a suitable test device detection algorithm. For example, if one or more of test or control regions are detected in the frame, the specifically programmed inventive data processing module may be configured to extract feature vectors and store the extracted information into one or more databases. In some embodiments, the exemplary inventive computing device may be configured to include a specifically programmed inventive test identification module which may be configured to compare the extracted features with previous information stored in the database. In some embodiments, if the specifically programmed inventive test identification module determines a match, then the new information is added to the existing data in order to increase the accuracy of further identification and/or improve the quality of the test result determination. In some embodiments, if the corresponding data is missing in the database, a new entry in created. In some embodiments, the resulting test result determination may be stored in the database for further analysis.

The use of lateral flow-based IV-RDT in disease diagnosis has greatly expanded recently, emphasized by the need for large population self-screening during the COVID-19 pandemic. However, a major drawback of this simple and economical solution for disease diagnosis and monitoring, especially relating to self-testing, has been the need for a reliable platform for test results recording and communication to the professional healthcare provider/HMO. To try and address this impediment, several solutions have been developed for IV-RDT results capture and their digital transfer. Capturing IV-RDT results can involve the use of dedicated readers that scan the lateral flow membrane to identify colored/fluorescent marker lines. Test results are thereafter communicated in a qualitative binary (Positive/Negative) mode to the operator.

However, identifying IV-RDT results with a camera is challenging because it by inability to detect the test result. One technological problem is that image acquisition can rely on accurate strip positioning vis-à-vis the mobile camera to optimize image capture. Such positioning can be unsupervised and requires multiple images to be captured until a processable image has been obtained. This may be challenging in cases where the IV-RDT device cannot be fixed to a certain position in space (e.g., IV-RDT that is not a cassette and therefore cannot be placed flat on a solid support).

Another technological problem is that image acquisition requires building a specific template for each type of IV-RDT that relies on external IV-RDT device features (e.g., cassette structure and specific added patterns, coloration, background illumination, etc.) to guide mobile camera positioning. Such features are absent or limited in test devices that deviate from the flat cassette format.

Yet another technological problem is that image analysis is difficult in cases where image acquisition isn't optimal. For example, the camera can be positioned too far from the object and image analysis of blurry objects is unfeasible.

Another technological problem is that shadows and reflections produced by different lighting positions and conditions, or user-introduced ones (e.g., blocking illumination or casting shadows), may result in a false line/feature or hide an existing one. This may lead to a false result obtained by the algorithm, which is expected to compromise the test's specificity and sensitivity.

Figure 2:
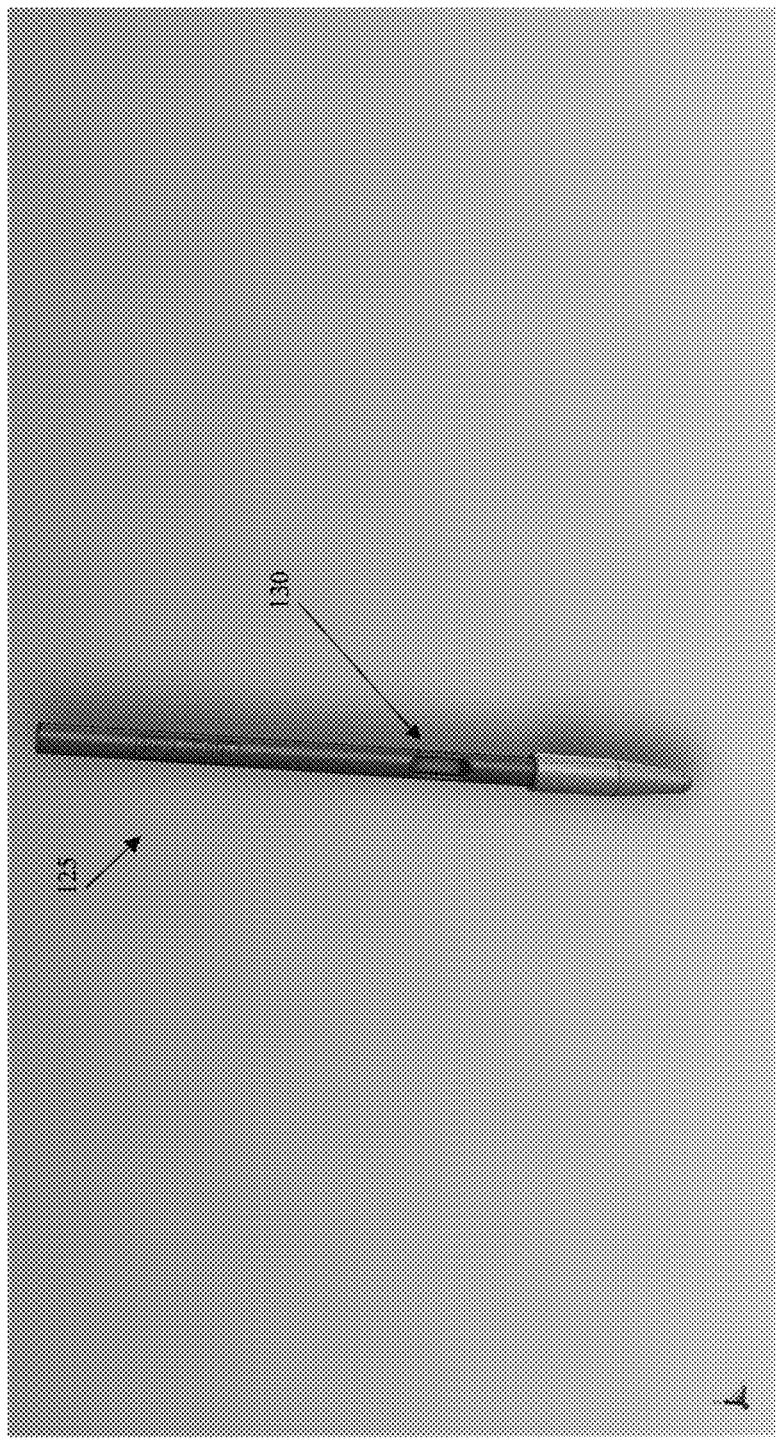
Figure 3:
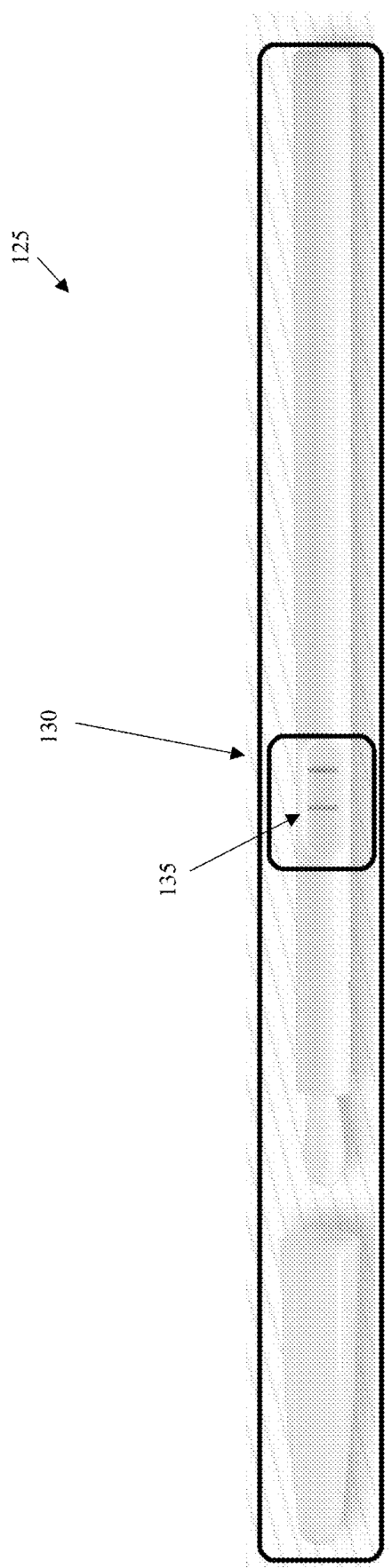

FIG. 1 depicts an embodiment of a detection system 100 including in server 105 in communication with a client device 110 having a camera 115 and a display application 120 (e.g., mobile application installed on the client device 110) for detecting a test device 125 to detect a test region 130 having a visual indicator 135 indicative of a test result 140. The test device 125 can include the test region 130 displaying a visual indicator 135 identifying the test result 140. As shown in FIG. 2, the test device 125 includes the test region 130. As shown in FIG. 3, the test device 125 includes the visual indicator 135.

The display application 120 can display interfaces to interactively guide the user to properly position the camera 115 to generate a first image stream of the test device 125. In some embodiments, the first image stream comprises screenshots of the test device 125. The server 105 can include neural networks for live detection, recognition and tracking of the test device 125. The server 105 can locate the test device 125 in the image stream and guide the user in real-time how to position the camera 115 for optimal recognition of the test region 130 to identify the test result 140.

The server 105 can generate imaging directing commands to adjust the camera 115 to capture the second image stream of the test region 130 of the test device 125. In some embodiments, the second image stream comprises screenshots of the test device 125. The neural networks can analyze the second image stream and identify the test result 140 from the visual indicator 135. Using techniques like back propagation, transfer learning and data modeling, the detection system 100 can learn, adopt and change over time.

In some embodiments, the server 105 is a standalone server that communicates with the client device 110, which can be a user device, mobile device with a phone camera or a mobile, web, or local device. In some embodiments, the server 105 can include at least one processor. In some embodiments, the client device 110 can include at least one processor.

The test device 125 can be a Rapid Diagnostic Test (RDT) for In-Vitro Diagnosis (IVD). The server 105 can visually analyze the test device 125 in real-time by receiving image streams of the test device 125 from the client device 110. The detection system 100 can be used to identify the test result 140 from the visual indicator 135 in the test region 130. In some embodiments, the test result 140 represented by the visual indicator 135 is binary (e.g., Positive/Negative). In some embodiments, the test result 140 represented by the visual indicator 135 is in semi-quantitative formats (e.g., 1-10). In some embodiments, the test result 140 represented by the visual indicator 135 is in quantitative formats (e.g., concentration, dose, levels).

The server 105 can include a deep learning module 145 for classifying images from the client device 110. In some embodiments, the deep learning module 145 may be configured to utilize computer vision techniques. The deep learning module 145 can include, utilize, or be a cloud-based AI Computer Vision (CV), Computer Vision (CV), Artificial Intelligence (AI), Deep Learning (DL), Web Applications, Live video stream, or Live Analysis by CV. In some embodiments, the deep learning module 145 may be configured to utilize one or more exemplary AI/computer vision techniques chosen from, but not limited to, decision trees, graph algorithm, boosting, support-vector machines, neural networks, nearest neighbor algorithms, Naive Bayes, bagging, random forests. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
  i) Define Neural Network architecture/model,
  ii) Transfer the input data to the exemplary neural network model,
  iii) Train the exemplary model incrementally,
  iv) determine the accuracy for a specific number of timesteps,
  v) apply the exemplary trained model to process the newly-received input data,
  vi) optionally and in parallel, continue to train the exemplary trained model with a predetermined periodicity.

In some embodiments and, optionally, in combination of any embodiment described above or below, the exemplary trained deep learning model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained deep learning model may also be specified to include other parameters, including but not limited to, bias values/functions and/or aggregation functions. For example, an activation function of a node may be a step function, sine function, continuous or piecewise linear function, sigmoid function, hyperbolic tangent function, ReLU function or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, the deep learning module 145 can include neural networks 146A-146N forming a modular neural network 148 for classifying the images from the client device 110. In some embodiments, the modular neural network 148 receives inputs from each of the neural networks 146A-146N. Each of the neural networks 146A-146N can be a convolutional neural network (CNN). In some embodiments, the neural networks 146A-146N can use a combination of CNN elements to convert the image/video from the image streams into inputs (e.g., nodes) for the deep learning techniques to feed the image input into a deep neural network (DNN) to identify the test result 140. In some embodiments, the deep learning module 145 can be a trained MAS (Multi Agent System) comprising the neural networks 146A-146N and the modular neural network 148 for computer recognition task division.

The server 105 can include a data store 150 for storing a corpus of reference images 152 of the test device 125 and a corpus of reference images 154 of the test region 130.

The server 105 can include a generator 155 for generating at least one imaging directing command for the client device 110 to capture the images of the test device 125. The deep learning module 145 can identify the test result 140 generated by the test device 125 based on the visual indicator 135.

Figure 4:
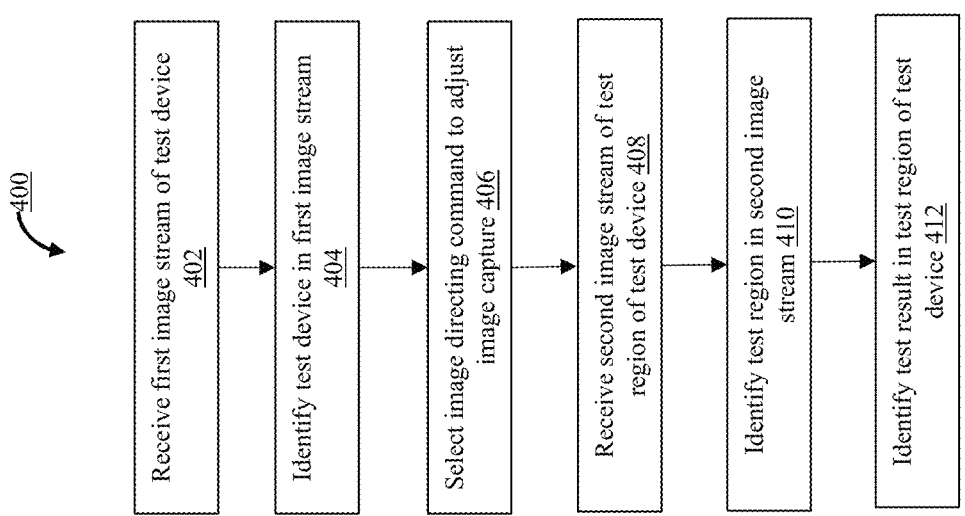

Now referring to FIG. 4, illustrates a method 400 for rapid diagnostic test result interpretation platform employing computer vision. In some embodiments, the display application 120 can display interactive instructions for task completion, such as for the user to use the test device 125 to generate the test result 140. For example, the instructions can be similar to conducting a COVID-19 antigen test.

The method 400 can include the server 105 receiving a first image stream of the test device 125 (STEP 402). The deep learning module 145 can establish a connection with the client device 110 to receive image streams from the client device 110. In some embodiments, the client device 110 can be connected in real-time to the cloud-based server 105 through a web socket. This socket can be established to facilitate communication between the display application 120 (e.g., client-side model (MAR)) and the server 105 (e.g., server-side model (CNN's)) once the test device 125 has been detected. For example, the deep learning module 145 can open a live port to an optical flow converter to optimize data flow. The deep learning module 145 can establish a request to open a live camera broadcast from the client device 110 that sends image streams to the server 105. In some embodiments, the detection system 100 can use an API call to open a live socket to the camera 115 broadcasting the image stream from an end-user that sends a request to the detection system 100. The live socket can establish a connection of video feeds from the client device 110 to a cloud-based deep-learning AI.

In some embodiments, the deep learning module 145 can transmit a user identification to the client device 110 (e.g., code, password, or token for a user device) that includes the camera 115. For example, the deep learning module 145 can provide the user with an ID for documentation. In some embodiments, the deep learning module 145 can receive a user validation, such as a token to comply with privacy regulations, to capture the image streams.

In some embodiments, the deep learning module 145 can establish a connection with the client device 110 responsive to receiving the user identification (e.g., token). The deep learning module 145 can use the connection established through a socket, so that a live stream from the client device 110 to the deep learning module 145 is established. For example, the deep learning module 145 can establish the connection with the display application 120. In some embodiments, the display application 120 can be a web application, native application, API, SDK, container (Docker) etc.

In some embodiments, the deep learning module 145 can receive the first imaging stream and the second imaging stream via the connection. For example, the deep learning module 145 can acquire a live video stream from the camera 115 of the client device 110. The deep learning module 145 can communicate with the client device 110. For example, the deep learning module 145 can use an open socket with the user identifier (e.g., user ID) to a cloud-based server. In some embodiments, the deep learning module 145 or the display application 120 can apply optical flow methods (such as Sparse Feature Propagation or Metadata keyframes extraction) on the video stream to minimize data transactions and achieve optimal recognition time of the test device 125 and the test region 130.

Figure 5A:
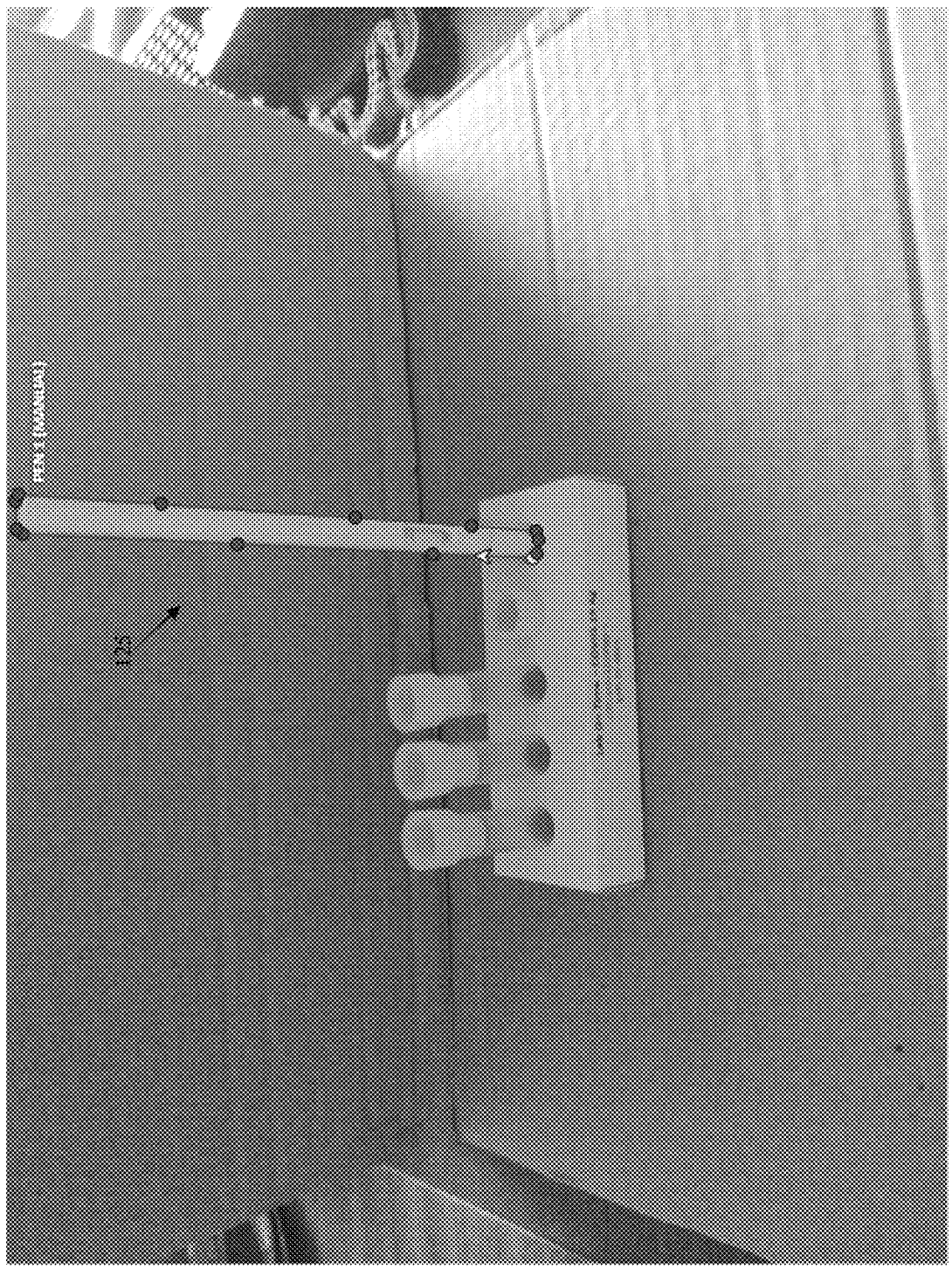
Figure 5B:
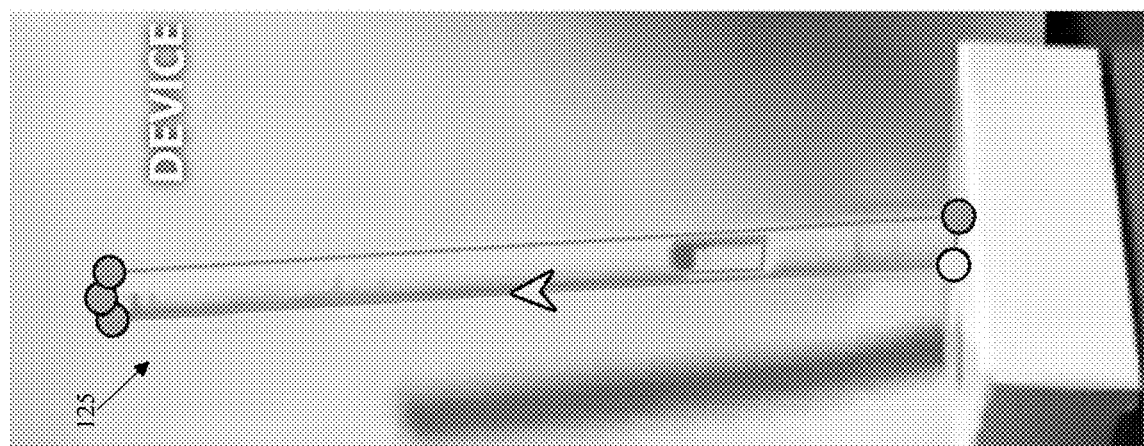

The method 400 can include the server 105 identifying the test device 125 in the first image stream (STEP 404). Now referring to FIG. 5A and FIG. 5B, shown is an image a first image stream of the test device 125. In some embodiments, the deep learning module 145 can receive a first image stream of the test device 125 from the client device 110. The deep learning module 145 can identify the test device 125 in the first image stream. In some embodiments, as shown in FIG. 5A and FIG. 5B, the deep learning module 145 can cause the display application 120 to display or highlight the test device 125 and the test region 130 in the first image stream. For example, as shown in FIG. 5B, the display application 120 can display the text "device" after identifying the test device 125 in the first image stream.

The deep learning module 145 can use the neural networks 146A-146N to recognize, track, or monitor the test device 125 and its position in the image stream. In some embodiments, the neural networks 146A-146N can use a combination of CNN elements to convert the image/video from the first image stream into inputs (e.g., nodes) for the deep learning techniques to feed the image input into a deep neural network (DNN) of the deep learning module 145 to identify the test device 125. For example, the modular neural network 148 can receive the inputs from the trained neural networks 146A-146N to allow the data collected from the first image stream through optical flow methods to be inserted in the relevant task of the modular neural network 148. The modular neural network 148 can process the inputs through one or more of its task-driven DNNs which pass information among themselves. In some embodiments, the deep learning module 145 can apply optical flow methods (such as Sparse Feature Propagation, Metadata keyframes extraction) on the image stream to minimize data transactions and achieve optimal (live) recognition time of the test device 125 and the test region 130.

The deep learning module 145 can classify the images in first image stream to identify the test device 125. The neural networks 146A-146N can receive and analyze the images of the test device 125. In some embodiments, as shown in FIG. 7, FIG. 8A, FIG. 8B, FIG. 9, FIG. 10, and FIG. 11, the neural networks 146A-146N can be convolutional neural networks that are part of the modular neural network 148 that identifies the test device 125 in the at least one first image in the first image stream.

After recognizing the test device 125, the neural networks 146A-146N can track the test device 125 and the modular neural network 148 can provide a live position of the test device 125 (e.g., x, y, z coordinates) to the display application 120. In some embodiments, the display application 120 can include the functionality of the deep learning module 145 to track the test device 125 (e.g., containing the IV-RDT test) while the deep learning module 145 analyzes the image stream for the generator 155 to generate and provide imaging directing commands for display by the display application 120 to guide the user to scan the test by marking the test device 125 and test region 130 on the screen controlled by the display application 120 as shown in FIGS. 5A and 5B.

The display application 120 can track and highlight the test device 125 to guide the user in real time to move the test device 125 or the camera 115 so that the test region 130 and visual indicator 135 can be recognized by the server 105. The deep learning module 145 can guide the user in "real time" with an interactive visual interface, text, and speech to achieve the best angle and position of the object in space and within the object to obtain best possible view of the test region 130. The neural networks 146A-146N can be updated and receive inputs from other neural networks 146A-146N as a feedback loop forming a recursive neural network (RNN) to retrain the neural networks 146A-146N to make corrections during the process of analyzing an image stream.

Figure 6:
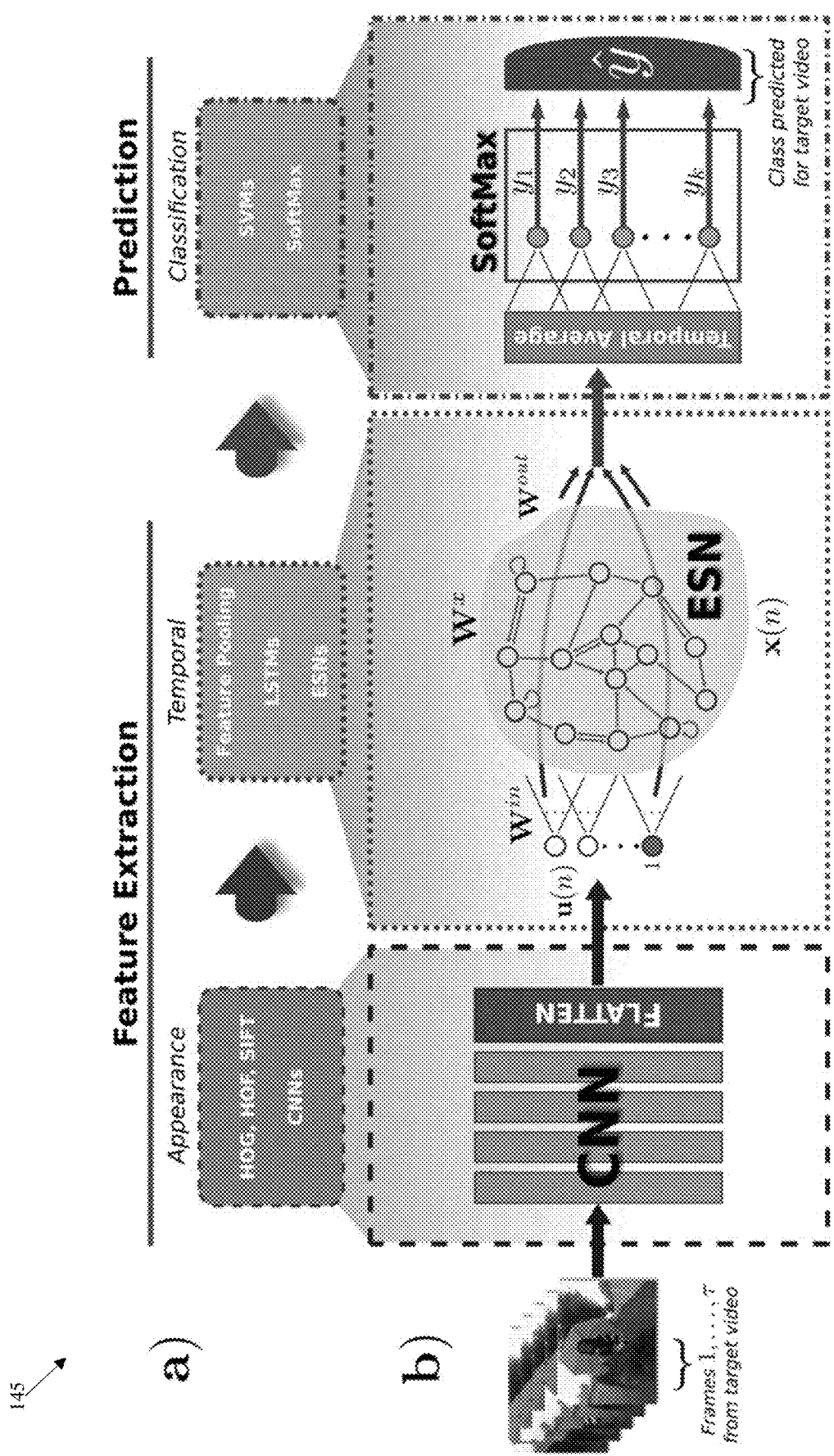
Figure 7:
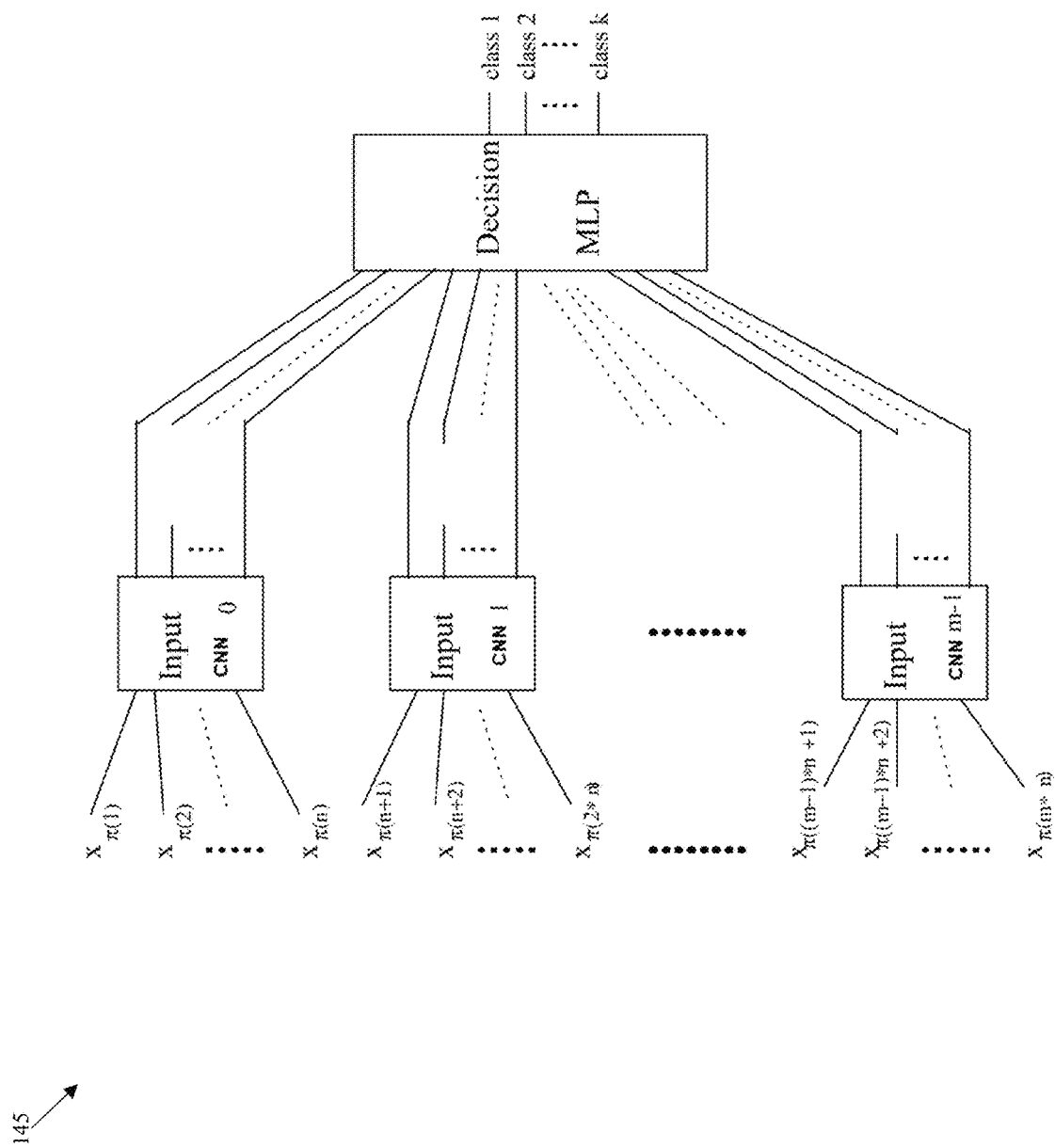
Figure 8A:
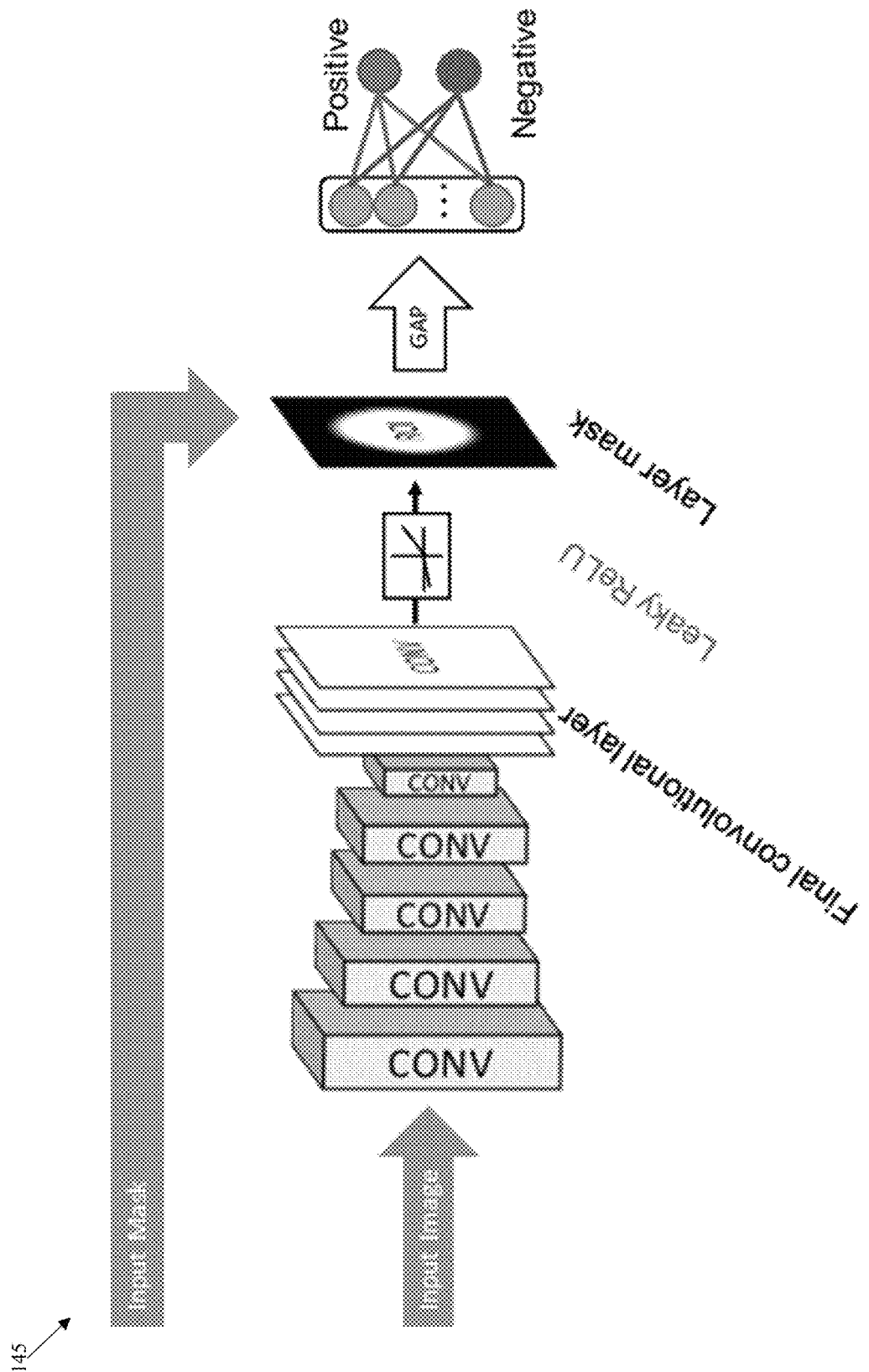
Figure 8B:
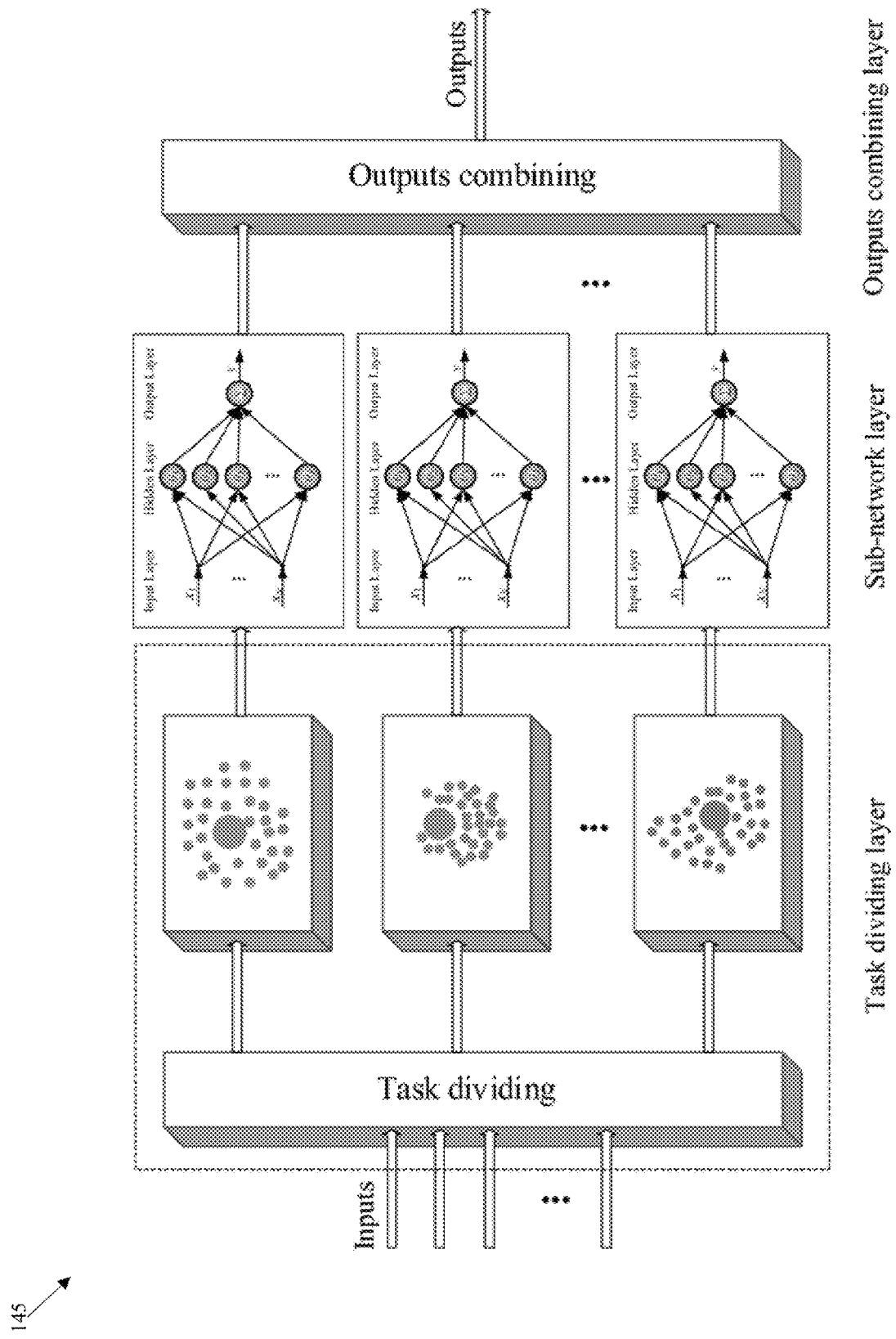
Figure 9:
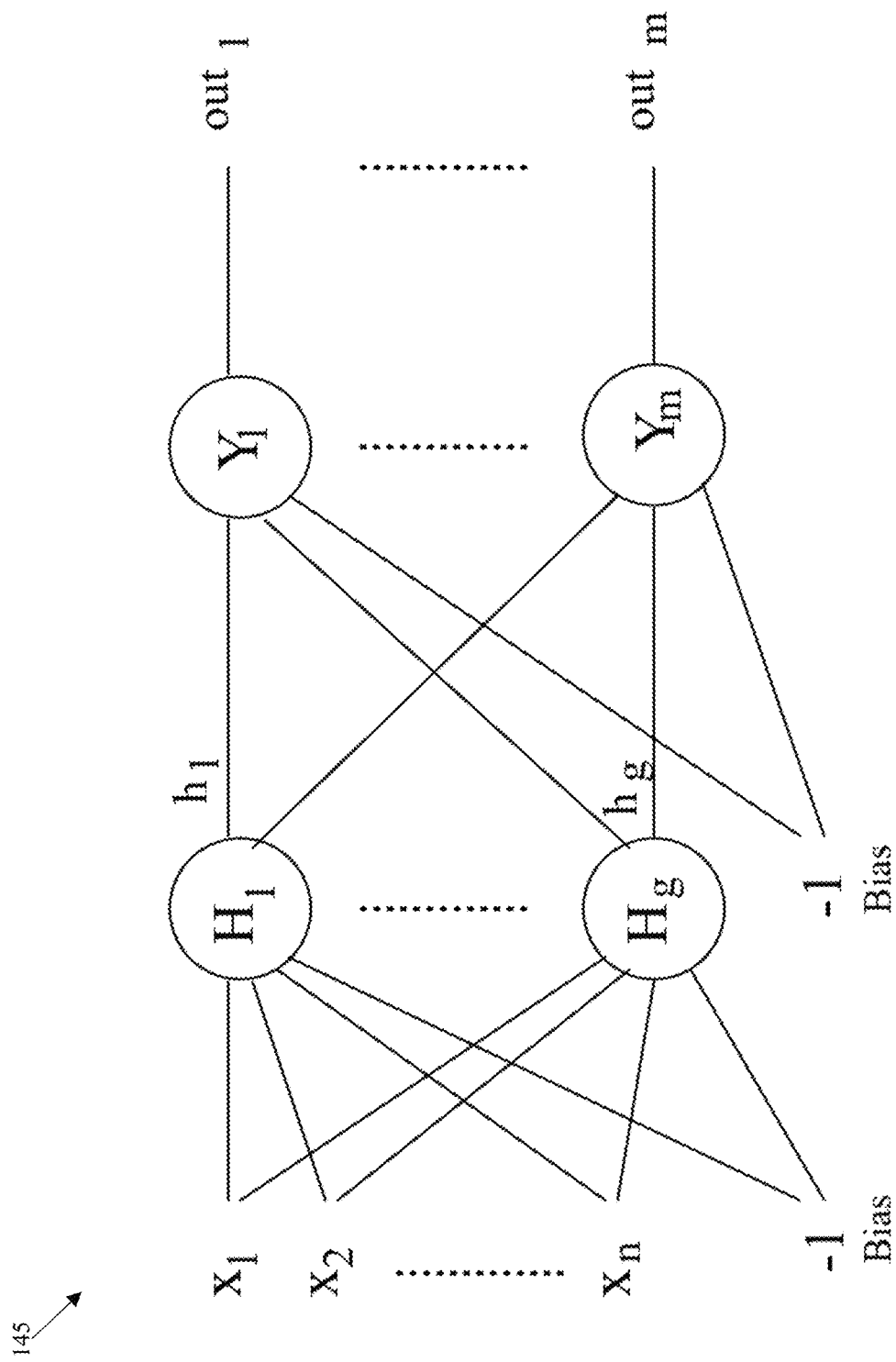
Figure 10:
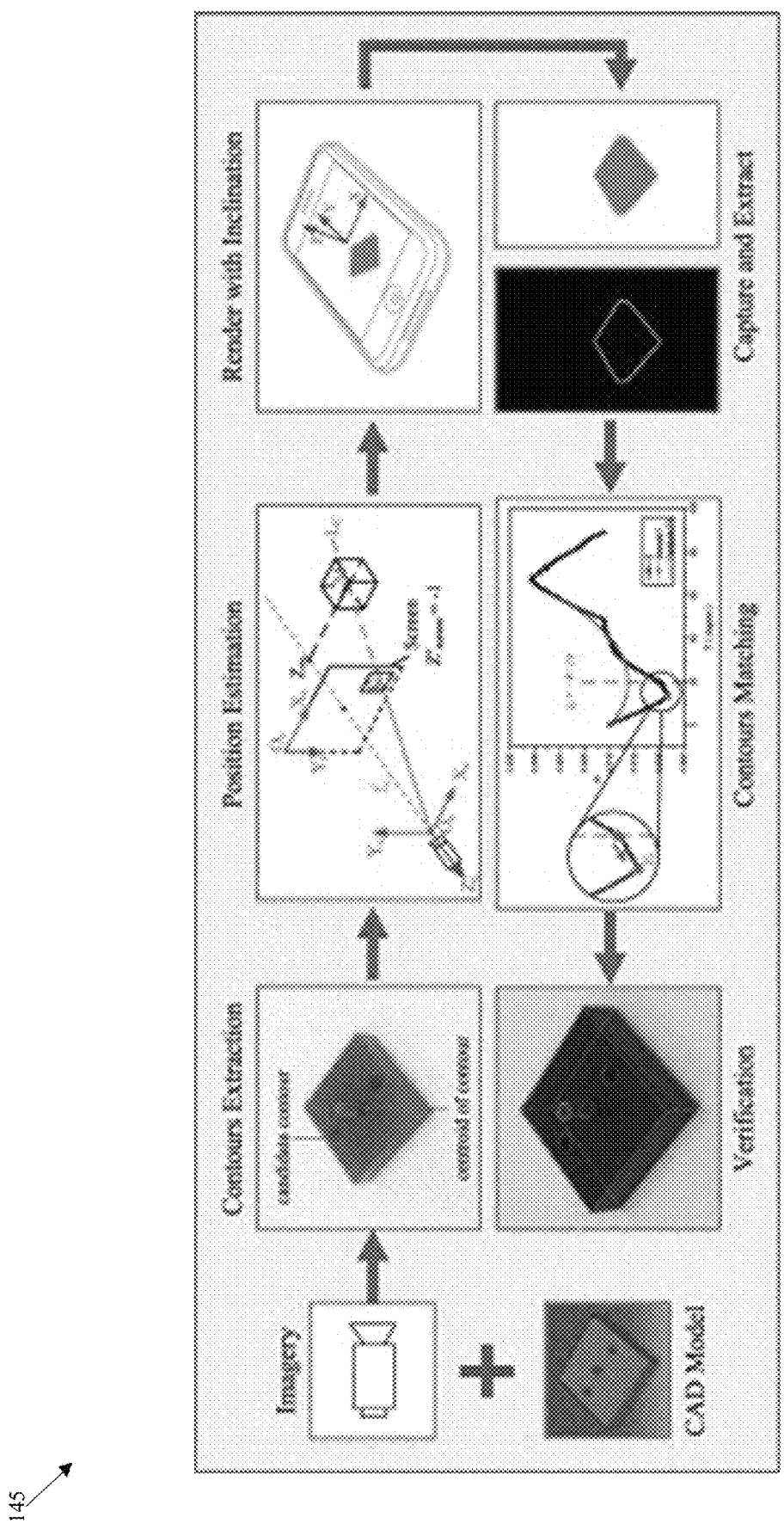
Figure 11:
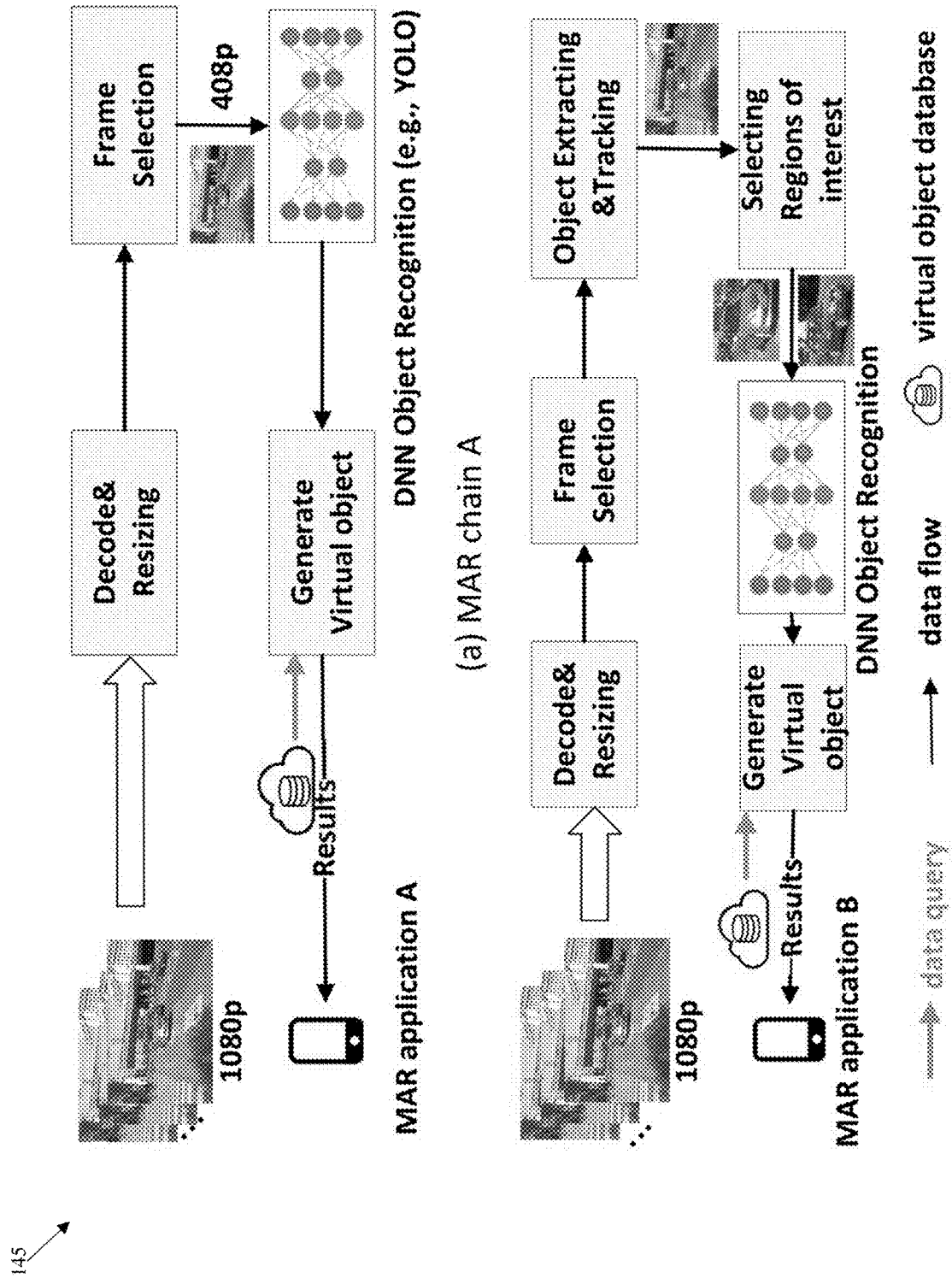

As shown in FIG. 6, in some embodiments, the deep learning module 145 can identify a plurality of device features of the test device 125 in the first image stream. In some embodiments, the plurality of device features are a plurality of structural features of the test device 125. For example, the deep learning module 145 can identify the points, edges or objects that make up the test device 125. For example, the deep learning module 145 can identify two features of the test device 125 to identify the test device 125 with a base-level confidence. In another example, the deep learning module 145 can identify three features of the test device 125 to identify the test device 125 with a higher confidence level. In yet another example, the deep learning module 145 can identify four features of the test device 125 to identify the test device 125 with an even higher confidence level.

In some embodiments, the corpus of reference images 152 can be images of the test device 125 for comparison by the neural networks 146A-146N to identify the test device 125 in the first image stream. In some embodiments, the corpus of reference images 154 can be images of the test region 130 for comparison by the neural networks 146A-146N to identify the test region 130 in the second image stream. In some embodiments, the deep learning module 145 can classify, based on the plurality of device features of the test device 125, at least one first image in the first image stream to at least one first reference image in the corpus of reference images 152 of the test device 125.

The method 400 can include the server 105, selecting imaging directing commands to adjust the image capture of the test device 125 (STEP 406). The server 105 can include the generator 155 for generating at least one imaging directing command for the client device 110 to capture the images of test region 130 of the test device 125. The imaging directing commands can be selected to image the test region 130 by using the client device 110 to optimize the image stream of the test region 130. The imaging directing commands can maximize the resolution of the test region 130 by improving focus and lighting at the location of the test region 130. For example, the imaging directing commands can cause the client device 110 to turn on a flash to improve lighting, implement a filter on the image, or to change the focus of the camera 115. The imaging directing commands can create optimal conditions for the deep learning module 145 to record the second image stream of the test region 130.

In some embodiments, the generator 155 can select, based on the at least one first reference image, at least one imaging directing command for the client device 110 to capture a second image stream. The second image stream can include the test region 130. For example, the imaging directing commands can cause the display application 120 to display interfaces that guide the user for best angle and position of the camera 115 relative to the test device 125 in space and within the object to obtain best possible second image stream of the test region 130.

In some embodiments, the generator 155 can generate, based on imaging directing metadata associated with the at least one first reference image, the at least one imaging directing command for the camera 115 to capture the second image stream of the test region 130. In some embodiments, the deep learning module 145 can identify at least one candidate imaging directing command. For example, the generator 155 can maintain candidate imaging directing commands in the data store 150. The candidate imaging directing commands can be default commands such as to request the user to twist the test device 125, turn a light on, zoom in or out, move up or down, or to adjust the focus of the camera 115.

In some embodiments, the at least one convolutional neural network 146A-146N can select the at least one imaging directing command of the at least one candidate imaging directing command. For example, the generator 155 can use ML (Deep learning) algorithms to analyze the image streams and generate commands for display by the display application 120 on the user interface.

In some embodiments, the generator 155 can instruct to implement the at least one imaging directing command to automatically generate the second image stream. In some embodiments, the generator 155 can instruct the client device 110 directly (e.g., change the focus of the camera 115). In some embodiments, to implement the at least one imaging directing command, the generator 155 can transmit the at least one imaging directing command to the client device 110 to cause the camera 115 to automatically generate the second image stream based on the at least one imaging directing command.

Figure 12A:
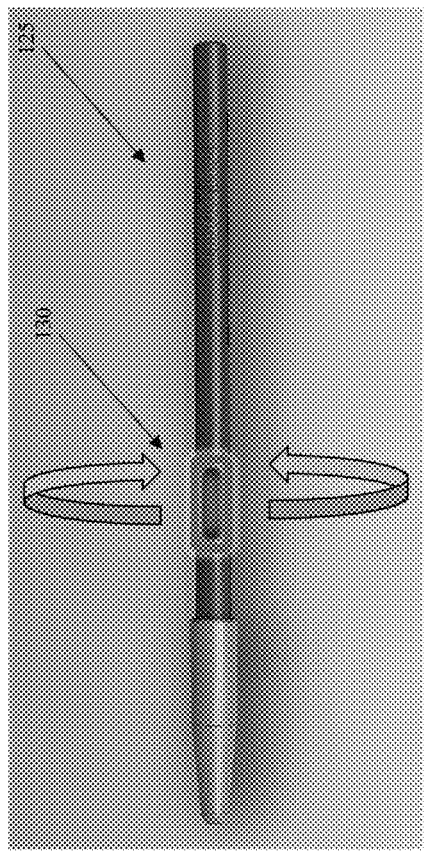
Figure 12C:
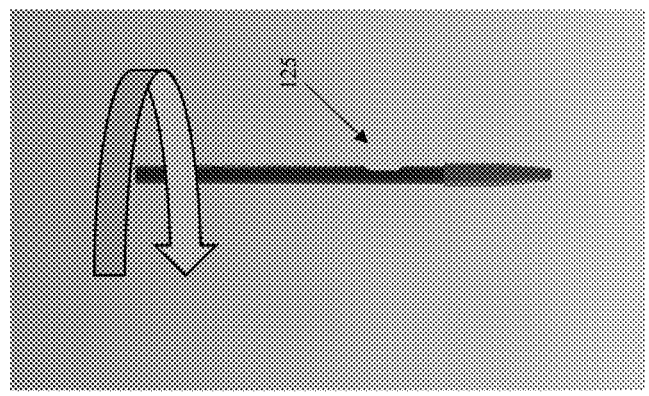
Figure 12B:
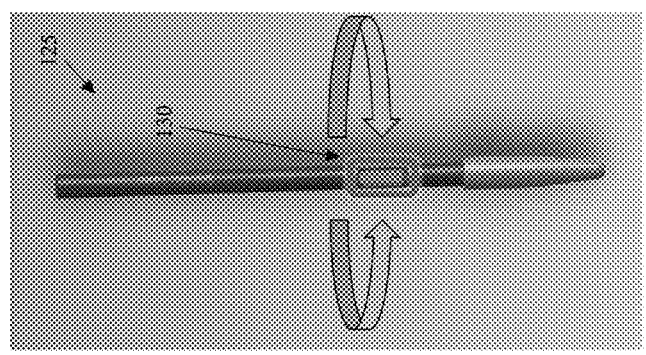

Now referring to FIG. 12A, FIG. 12B, and FIG. 12C, in some embodiments, the generator 155 can instruct a user of the client device 110 (e.g., request the user to reposition the client device 110 for a different view of the test device 125). In some embodiments, the generator 155 can transmit, to the client device 110 that includes the camera 115, the at least one imaging directing command comprising augmented reality instructions for the display application 120 to overlay on the first image stream to direct a user to reposition the camera to capture the test device. The augmented reality instructions can indicate how the user can reposition the client device 110 to image the test region 130. For example, the display application 120 can display the second image stream to the user on a display of the client device 110. The augmented reality instructions can be overlaid over the test device 125 to indicate how the user can reposition the client device 110 to image the test region 130. As shown in FIGS. 12A-12C, the augmented reality instructions can request the user to rotate the test device 125 to bring the test region 130 into view of the camera 115.

Figure 13:
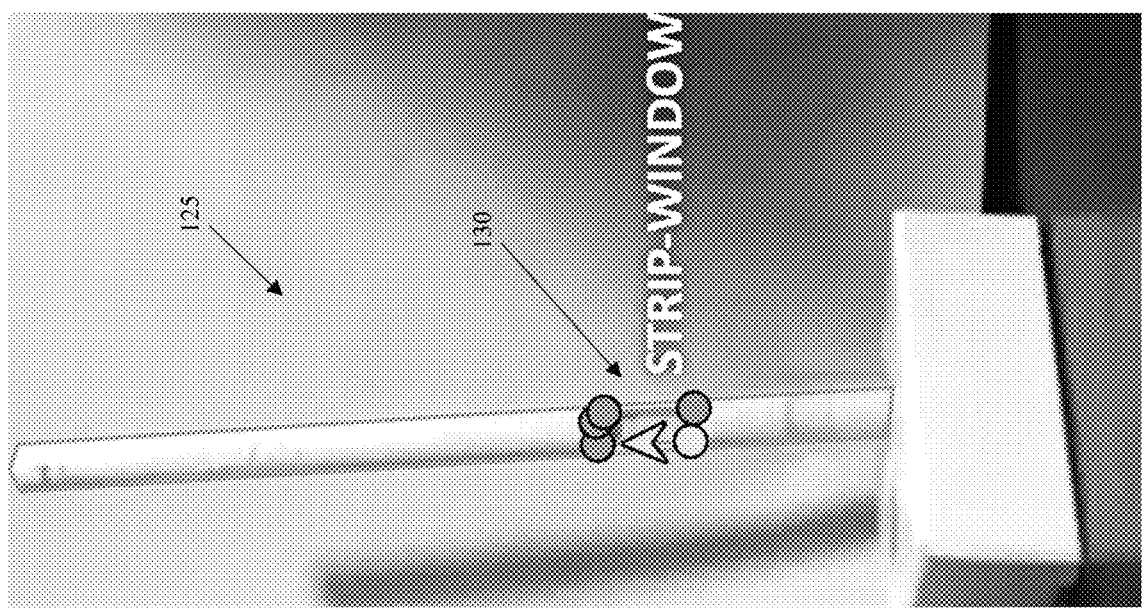

The method 400 can include the server 105 receiving a second image stream of the test region 130 of the test device 125 (STEP 408). Now referring to FIG. 13, shown is an image of the second image stream of the test device 125. In some embodiments, the deep learning module 145 can receive the second image stream from the client device 110 adjusted with the at least one imaging directing command. Once the camera 115 has been positioned based on the at least one imaging directing command, the deep-learning algorithm of the deep learning module 145 analyzes keyframes provided by the client device 110. The deep learning module 145 can perform this analysis until a sufficient number of images has been gathered to identify the test result 140.

The method 400 can include the server 105 identifying the test region 130 in the second image stream (STEP 410). The deep learning module 145 can classify the images in the second image stream to identify the test region 130 and the visual indicator 135. The neural networks 146A-146N can receive and analyze the images in the second image stream using techniques described herein, including to identify the test region 130 that includes the visual indicator 135 and to identify the test result 140 itself. In some embodiments, as shown in FIG. 7, FIG. 8A, FIG. 8B, FIG. 9, FIG. 10, and FIG. 11, the neural networks 146A-146N can be convolutional neural networks that are part of the modular neural network 148 that identifies the test region 130 in the at least one first image in the second image stream.

The deep learning module 145 can identify the test region 130 in the second image stream. In some embodiments, the deep learning module 145 can identify a plurality of device features of the test region 130 in the second image stream. In some embodiments, the plurality of device features of the test region 130 are a plurality of structural features of the test region 130. For example, the deep learning module 145 can identify the points, edges or objects that make up the test region 130. In some embodiments, the deep learning module 145 can identify the plurality features that make up the test region 130. For example, the deep learning module 145 can identify two features of the test region 130 to identify the test region 130 with a base confidence level. In another example, the deep learning module 145 can identify three features of the test region 130 to identify the test region 130 with a higher confidence level. In yet example, the deep learning module 145 can identify four features of the test region 130 to identify the test region 130 with even higher confidence.

The deep learning module 145 can use the neural networks 146A-146N to recognize, track, or monitor the test region 130 and its position in reference to the test device 125. In some embodiments, the deep learning module 145 can use a combination of convolution neural networks 146A-146N to identify the test device 125. In some embodiments, the deep learning module 145 can classify, based on the plurality of device features of the test region 130, at least one second image in the second image stream to at least one second reference image in a corpus of reference images 154 of the test region 130. For example, the deep learning module 145 can apply the neural networks, algorithms, and image recognition methods to analyze the second image stream including the test region 130 to identify the visual indicator 135.

In some embodiments, as shown in FIG. 13, the deep learning module 145 can cause the display application 120 to display or highlight the test device 125 and the test region 130 in the second image stream. For example, as shown in FIG. 13, the display application 120 can display the text "strip-window" after identifying the test device 125 in the first image stream.

In some embodiments, if the deep learning module 145 is unable to identify the test region 130 in the second image stream, the modular neural network 148 can generate at least one imaging directing command that include camera settings so that automated focusing of the camera 115 can be applied and adjusted. The neural networks 146A-146N can maintain a feedback loop forming a recursive neural network (RNN) to optimize camera sensitivity and illumination settings. The generator 155 can monitor as camera frames are collected, analyzed, and filtered, to select frames from which to optimize the quality of the images that are being used by the deep learning module 145 to identify the test result 140. In some embodiments, the generator 155 can generate additional imaging directing commands as discussed in STEP 406.

The method 400 can include the server 105 identifying the test result 140 in the test region 130 of the test device 125 (STEP 412). In some embodiments, the deep learning module 145 can identify, based on the at least one second reference image, the test result 140 based on the visual indicator 135 in the test region 130 in at least one of the second image. For example, the deep learning module 145 can identify the visual indicator in the test region 130 in the second image.

In some embodiments, the deep learning module 145 can cause the display application 120 to display the test result 140. For example, the deep learning module 145 can cause the display application 120 to display the test result 140 as QR code. In another example, the deep learning module 145 can cause the display application 120 to display the test result 140 as a number or an indicator (e.g., Positive or Negative).

In some embodiments, the deep learning module 145 can store the test result 140. For example, the deep learning module 145 can document the test result 140 and associate the test result with an identifier such as an identifier of the user or the patient. In some embodiments, the deep learning module 145 can store the test results 140 in the data store 150.

In some embodiments, the detection system 100 can use mobile computer vision and cloud-based AI (with web application UX/UI) for live diagnosis of IV-RDT. The detection system 100 can include an SDK platform for simple interactions with medical records systems and communication with professionals and HMOs. In some embodiments, the deep learning module 145 can transmit, to an administrator device, the test result 140 for display. For example, the administrator device can be an HMO and the deep learning module 145 can transmit the test results 140 to the HMO and update a medical file of the user or the patient. The server 105 can transmit the test result 140 back to the user, operator, HMO, or physician for further confirmation, recording, and medical treatment decision/follow-up. For example, the server can provide the test result 140 as a response to the user and/or to the HMO/physician. The detection system 100 can close the loop between the user of the test device 125 and the HMO/physician for recording of the test result 140 and the provision of medical treatment/follow-up.

In some embodiments, if the deep learning module 145 is unable to identify the test result 140 from the visual indicator 135 in the test region 130 of the second image stream, the generator 155 can generate additional imaging directing commands as discussed in STEP 406.

From the synergistic combination of these technologies and platforms, the detection system 100 can overcome numerous technical challenges and includes numerous technical solutions.

One technical solution is that the display application 120 comprises a pre-trained 3D object detector and tracker MAR (Mobile Augmented Realty) model to detect and track the test device 125 by using the RAM of the client device 110 while the GPU of the server 105 analyzes the image stream and generates the imaging directing commands. By splitting the processing between the server 105 and the client device 110, the embodiments described herein enable the use of less memory while ensuring faster processing times because the test device 125 is tracked by the nearby client device 110 while the neural networks 146A-146N forming the modular neural network 148 recursively analyze the image stream to generate the imaging directing commands to identify the test result 140.

Another technical solution of the detection system 100 is creating the display application 120 as a secure web app with a user-friendly UX/UI to access the camera 115. Another technical solution of the detection system 100 is the display application 120, which reduces the need to install complex apps on mobile devices. Another technical solution of the detection system 100 is that the display application 120 can be easily deployed and used on any smart client device 110.

Another technical solution is that the server 105 can use PWA (Progressive Web Applications), accompanied by developments in cloud servers, to improve accuracy of deep learning models and increased ML algorithm speeds. The detection system 100 can use a CV algorithm with a trained (per task) CNN to locate sub-objects (SO), which can be the test region 130, and analyze them in real-time to meet specific diagnostic task requirements. Another technical solution of the detection system 100 is reduce the need for image capture by the client device 125, which can overcome issues relating to proper positioning of the camera 115 for effective image capture.

Another technical solution of the detection system 100 is managing the SDK with different API calls and supporting a dynamically guided user-friendly application/interface. Another technical solution of the detection system 100 is developing a user-side ML model for fast and efficient data compression and minimization for improved socket to the cloud server communication. Another technical solution of the detection system 100 is developing a computer vision technique of a deep learning module as a MAS (Multi Agent System) with MNN architecture that combines CNNs, RNN's and NNs for the different tasks and managing and manipulating them to support multiple models. Another technical solution of the detection system 100 is developing efficient training protocols for the different CNN models using data gathering and annotations to enhance model training. Another technical solution of the detection system 100 is developing a responsive application for a "real time" user experience. Yet another technical solution of the detection system 100 is connecting to different clients (HMO etc.) with minimal perturbation. Another technical solution of the detection system 100 is quality management to optimize and maintain test specificity and sensitivity. Another technical solution of the detection system 100 is approving these tools for clinical use through the different regulatory authorities.

Another technical solution of the detection system 100 is increased test accuracy by using deep learning AI algorithms over applications that employ only deep learning models. Another technical solution of the detection system 100 reduces the need of modeling each test shape and makes it easy to recognize complex geometric shapes. Another technical solution of the detection system 100 is increased adaptive diagnostic test accuracy over time with the ability to obtain semi-quantitative or even quantitative test results. Another technical solution of the detection system 100 is improving the overall UX/UI of the application through live guidance of the VR model that communicates with the AI model's. Another technical solution of the detection system 100 is supporting multiple users with live streaming through a Linux cloud-based server application. Another technical solution of the detection system 100 is that switching between the task(s), Object(s), and/or SO(s) is simplified. Another technical solution of the detection system 100 is that security can be established between the server 105 and the client device 110 through gateway connectivity to a secure and different backend server/proxy.

Figure 14:
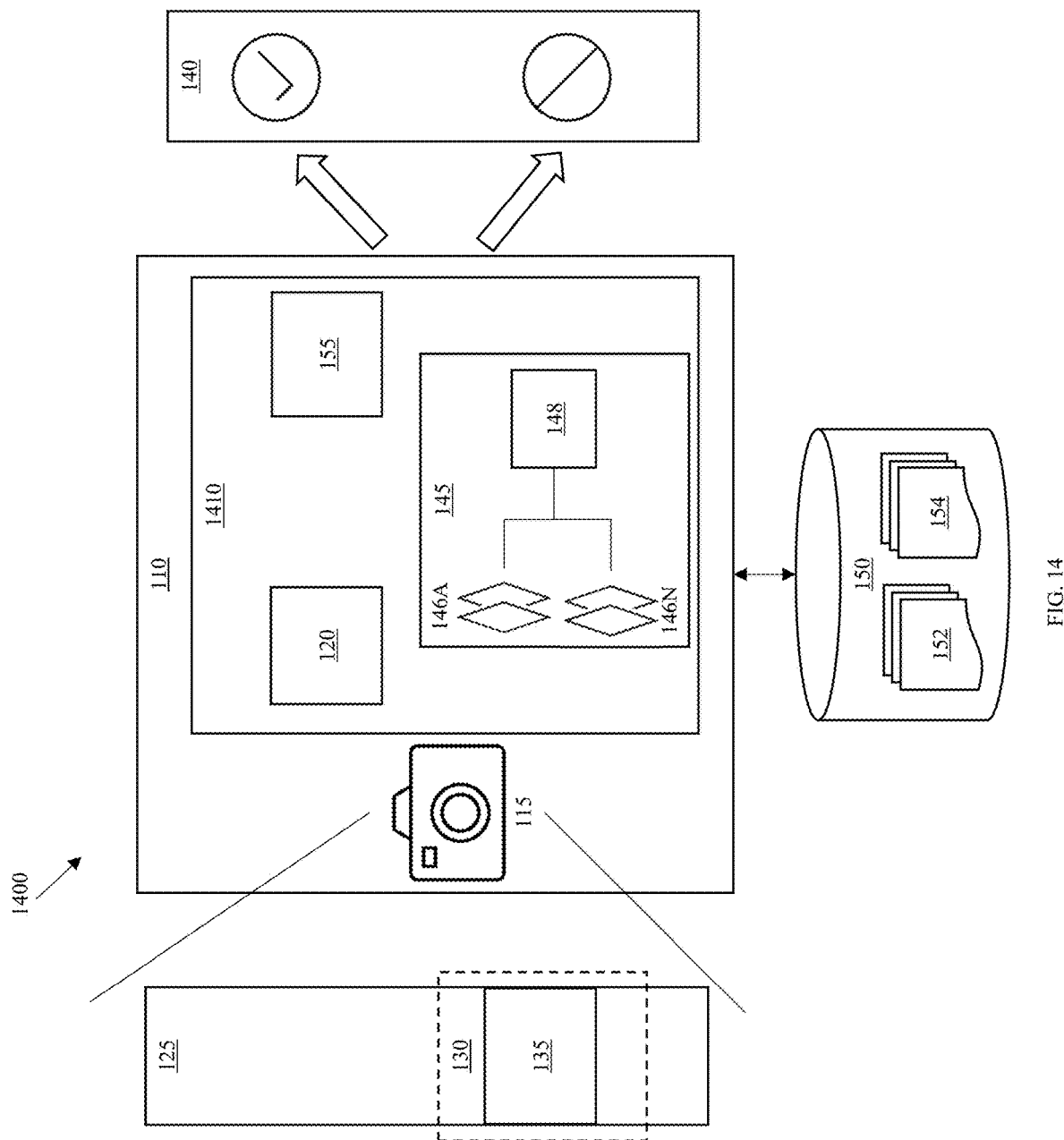

Now referring to FIG. 14, shown is a system 1400, which in some embodiments, includes a client device 110 including the camera 115 and an application 1410 including the display application 120, the deep learning module 145, and the generator 155. The system 1400 can be used for visually analyzing In-Vitro Rapid Diagnostic Test (IV-RDT) devices using Computer Vision (CV) and Mobile Augmented Realty (MAR) executing on a client based-device. For example, the client device 110 can be hardware, such as a mobile phone or smart camera, that is configured to execute the application 1410, which can be a software application configured to perform the functionality of the display application 120, the deep learning module 145, and the generator 155. In some embodiments, the application 1410 can be a web application, native application, API, SDK, container (Docker), etc. In some embodiments, the deep learning module 145 is part of the application 1410 such that a mobile device can apply the neural networks 146 forming the modular neural network 148 to the image streams generated by the camera 115. In some embodiments, the client device 110 can be communicatively coupled to the data store 150. For example, the data store 150 can be hosted on a server or cloud. In some embodiments, the client device 110 can include any or all of the components 115-155 described herein, including the data store 150 such that the client device 110 can execute the functionalities described herein while being offline.

Figure 15:
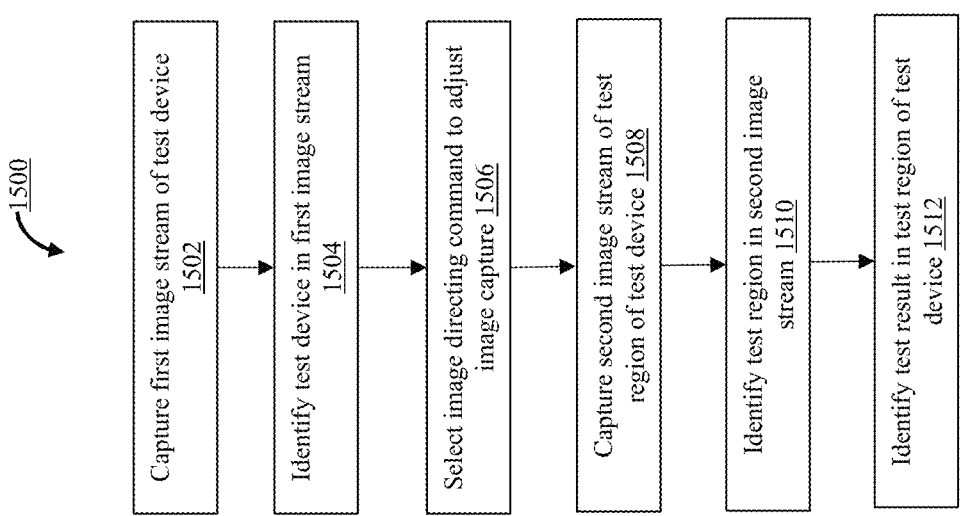

Now referring to FIG. 15, a method 1500 for rapid diagnostic test result interpretation platform employing computer vision is illustrated. The method 1500 can include the application 1410 capturing a first image stream of the test device 125 (STEP 1502). In some embodiments, the display application 120 can display interactive instructions for task completion, such as for the user to use the test device 125 to generate the test result 140. For example, the instructions can be similar to conducting a COVID-19 Antigen test.

The method 1500 can include the application 1410 identifying the test device 125 in the first image stream (STEP 1504). Now referring to FIG. 5A and FIG. 5B, shown is an image a first image stream of the test device 125. In some embodiments, the application 1410 can capture a first image stream of the test device 125. The application 1410 can identify the test device 125 in the first image stream. In some embodiments, as shown in FIG. 5A and FIG. 5B, the display application 120 can display or highlight the test device 125 and the test region 130 in the first image stream. For example, as shown in FIG. 5B, the display application 120 can display the text "device" after identifying the test device 125 in the first image stream.

In some embodiments, the application 1410 can apply the deep learning module 145 to classify the images to identify the test region 130 and the visual indicator 135. For example, the application 1410 can apply optical flow methods (such as Sparse Feature Propagation, Metadata keyframes extraction) on the image stream to minimize data transactions and achieve optimal (live) recognition time of the test device 125 and the test region 130.

The application 1410 can use the neural networks 146A-146N to recognize, track, or monitor the test device 125 and its position in the image stream. Each model can include at least one convolutional neural network or other deep learning algorithm. For example, each section of the MNN can include a trained CNN (Convolution Neural Network) to allow the data collected from the first image stream through the optical flow methods to be inserted in the relevant model task. In some embodiments, the application 1410 can use a combination of CNN elements to identify the test device 125.

In some embodiments, the application 1410 can include neural networks 146A-146N forming a modular neural network 148 to analyze the images of the test device 125 using techniques described herein, including to identify the test region 130 that includes the visual indicator 135 and to identify the test result 140 itself. In some embodiments, the deep learning module 145 includes at least one modular neural network 148. For example, the application 1410 can include the neural networks 146A-146N and the modular neural network 148 for computer recognition task division.

In some embodiments, the modular neural network 148 receives inputs from each of the neural networks 146A-146N. In some embodiments, as shown in FIG. 7, FIG. 8A, FIG. 8B, FIG. 9, FIG. 10, and FIG. 11, the at least one neural networks 146A-146N are part of the modular neural network 148 that identifies the test device 125 in the at least one first image in the first image stream. Each of the neural networks 146A-146N can be a convolutional neural network (CNN). In some embodiments, the neural networks 146A-146N can use a combination of CNN elements to identify the test device 125.

After recognizing the test device 125, the CNN of the application 1410 can track the test device 125 and provide a live position of the test device 125 (e.g., x, y, z coordinates). The application 1410 can track and highlight the test device 125 to guide the user in real time to move the test device 125 or the camera 115 so that the test region 130 and visual indicator 135 can be recognized by the deep learning module 145. The application 1410 can guide the user in "real time" with an interactive visual interface, text, and speech to achieve the best angle and position of the object in space and within the object to obtain best possible view of the test region 130. The application 1410 can be updated and receive inputs from other neural networks 146A-146N as a feedback loop forming a recursive neural network (RNN) to retrain the neural networks 146A-146N to make corrections during receipt of the image stream.

As shown in FIG. 6, in some embodiments, the application 1410 can identify a plurality of device features of the test device 125 in the first image stream. For example, the application 1410 can identify the features that make up the test device 125. In some embodiments, the plurality of device features is a structural feature. In some embodiments, the application 1410 can transmit, to the data store 150, the plurality of device features of the test device 125. In some embodiments, the application 1410 can store the plurality of device features of the test device 125 on a local storage of the client device 110.

In some embodiments, the application 1410 can access corpus of reference images 152 and 154 stored locally on the client device 110. In some embodiments, the application 1410 can establish a connection with the data store 150 to access the corpus of reference images 152 and 154. For example, the data store 150 can open a live port to an optical flow converter to optimize data flow. In some embodiments, the application 1410 can receive a user identification from the data store 150. In some embodiments, the application 1410 can receive a user validation, such as for a regulatory body/entity, to capture the image streams. The application 1410 can use the connection established through a socket, so that a live stream from the application 1410 to the data store 150 is established. For example, the data store 150 can establish the connection with the application 1410.

The method 1500 can include the application 1410 selecting imaging directing commands to adjust the image capture of the test device 125 (STEP 1506). The application 1410 can generate at least one imaging directing command for the application 1410 to capture images of the test region 130 of the test device 125. The imaging directing commands can be selected to image the test region 130 by using the application 1410 to optimize the image stream of the test region 130. The imaging directing commands can maximize the resolution of the test region 130 by improving focus and lighting at the location of the test region 130. For example, the imaging directing commands can cause the application 1410 to turn on a flash to improve lighting (e.g., turn light on), implement a filter on the image, or to change the focus of the camera 115. The imaging directing commands can create optimal conditions for the application 1410 to record the second image stream of the test region 130.

In some embodiments, the application 1410 can select, based on the at least one first reference image, at least one imaging directing command for the application 1410 to capture a second image stream. The second image stream can include the test region 130. For example, the imaging directing commands can cause the application 1410 to display interfaces that guide the user for best angle and position of the camera 115 relative to the test device 125 in space and within the object to obtain best possible second image stream of the test region 130.

In some embodiments, the application 1410 can generate, based on imaging directing metadata associated with the at least one first reference image, the at least one imaging directing command for the camera 115 to capture the second image stream of the test region 130. In some embodiments, the application 1410 can receive, from the data store 150, the imaging directing metadata associated with the at least one additional reference image. In some embodiments, the application 1410 can retrieve, from a local storage of the system 1400, the imaging directing metadata associated with the at least one additional reference image.

In some embodiments, the application 1410 can use the deep learning module 145 to identify at least one candidate imaging directing command. For example, the application 1410 can maintain candidate imaging directing commands in a local storage. In some embodiments, the application 1410 can receive candidate imaging directing commands from the data store 150. The candidate imaging directing commands can be default commands such as to request the user to twist the test device 125, turn a light on, zoom in or out, move up or down, or to adjust the focus of the camera 115.

In some embodiments, the application 1410 can select the at least one imaging directing command of the at least one candidate imaging directing command. For example, the application 1410 can use ML (Machine Learning) algorithms to analyze the image streams and generate commands for display by the display application 120 on the user interface.

In some embodiments, the application 1410 can instruct to implement the at least one imaging directing command to automatically generate the second image stream. In some embodiments, the application 1410 can instruct the camera 115 directly (e.g., change the focus of the camera 115). In some embodiments, to implement the at least one imaging directing command, the application 1410 can execute the at least one imaging directing command to cause the camera 115 to automatically generate the second image stream based on the at least one imaging directing command.

Now referring to FIG. 12A, FIG. 12B, and FIG. 12C, in some embodiments, the application 1410 can instruct a user (e.g., request the user to reposition the camera 115 for a different view of the test device 125). In some embodiments, the application 1410 can cause, based on at least one imaging directing command comprising augmented reality instructions, the application 1410 to overlay on the first image stream to direct a user to reposition the camera to capture the test device. The augmented reality instructions can indicate how the user can reposition the camera 115 to image the test region 130. For example, the display application 120 can display the second image stream to the user on a display of the application 1410. The augmented reality instructions can be overlaid over the test device 125 to indicate how the user can reposition the camera 115 to image the test region 130. As shown in FIGS. 12A-12C, the augmented reality instructions can request the user to rotate the test device 125 to bring the test region 130 into view of the camera 115.

The method 1500 can include the application 1410 capturing a second image stream of the test region 130 of the test device 125 (STEP 1508). Now referring to FIG. 13, shown is an image of the second image stream of the test device 125. In some embodiments, the application 1410 can receive the second image stream from the camera 115 adjusted with the at least one imaging directing command. Once the camera 115 has been positioned based on the at least one imaging directing command, the deep-learning algorithm of the application 1410 analyzes keyframes provided by the camera 115. The deep learning module 145 can perform this analysis until a sufficient number of images has been gathered to identify the test result 140.

The method 1500 can include the application 1410 identifying the test region 130 in the second image stream (STEP 1510). The deep learning module 145 can classify the images in the second image stream to identify the test region 130 and the visual indicator 135. The neural networks 146A-146N can receive and analyze the images in the second image stream using techniques described herein, including to identify the test region 130 that includes the visual indicator 135 and to identify the test result 140 itself. In some embodiments, as shown in FIG. 7, FIG. 8A, FIG. 8B, FIG. 9, FIG. 10, and FIG. 11, the neural networks 146A-146N can be convolutional neural networks that are part of the modular neural network 148 that identifies the test region 130 in the at least one first image in the second image stream.

The application 1410 can identify the test region 130 in the second image stream. In some embodiments, the application 1410 can apply the deep learning module 145 to identify a plurality of device features of the test region 130 in the second image stream. In some embodiments, the application 1410 can transmit, to the data store 150, the plurality of device features of the test region 130. In some embodiments, the application 1410 can store, in a local storage of the system 1400, the plurality of device features of the test region 130.

The application 1410 can use the neural networks to recognize, track, or monitor the test region 130 and its position in reference to the test device 125. In some embodiments, the application 1410 can use a combination of CNN elements to identify the test device 125.

In some embodiments, the application 1410 can apply the deep learning module 145 to classify, based on the plurality of device features of the test region 130, at least one second image in the second image stream to at least one second reference image in a corpus of reference images 154 of the test region 130. For example, the application 1410 can apply the neural networks, algorithms, and image recognition methods to analyze the second image stream including the test region 130 to identify the visual indicator 135.

In some embodiments, as shown in FIG. 13, the application 1410 can cause the display application 120 to display or highlight the test device 125 and the test region 130 in the second image stream. For example, as shown in FIG. 13, the display application 120 can display the text "strip-window" after identifying the test device 125 in the first image stream.

In some embodiments, if the application 1410 is unable to identify the test region 130 in the second image stream, the modular neural network 148 can generate at least one imaging directing command that include camera settings so that automated focusing of the camera 115 can be applied and adjusted. The neural networks 146A-146N can maintain a feedback loop forming a recursive neural network (RNN) to optimize camera sensitivity and illumination settings. The application 1410 can monitor as camera frames are collected, analyzed, and filtered, to select frames from which to optimize the quality of the images that are being used by the application 1410 to identify the test result 140. In some embodiments, the application 1410 can generate additional imaging directing commands as discussed in STEP 1506.

The method 1500 can include the application 1410 identifying the test result 140 in the test region 130 of the test device 125 (STEP 1512). In some embodiments, the application 1410 can identify, based on the at least one second reference image, the test result 140 based on the visual indicator 135 in the test region 130 in at least one of the second images. For example, the application 1410 can identify the visual indicator in the test region 130 in the second image.

In some embodiments, the application 1410 can cause the display application 120 to display the test result 140. For example, the application 1410 can display the test result 140 as a QR code. In another example, the application 1410 can display the test result 140 as a number or an indicator (e.g., Positive or Negative).

In some embodiments, the application 1410 can store the test result 140. For example, the application 1410 can document the test result 140 and associate the test result with an identifier such as an identifier of the user or the patient. In some embodiments, the application 1410 can store the test results 140 in the data store 150. In some embodiments, the application 1410 can transmit, to an administrator device, the test result 140 for display. For example, the administrator device can be an HMO and the application 1410 can transmit the test results 140 to the HMO and update a medical file of the user or the patient.

In some embodiments, if the application 1410 is unable to identify the test result 140 from the visual indicator 135 in the test region 130 of the second image stream, the application 1410 can generate additional imaging directing commands as discussed in STEP 1506.

From the synergistic combination of these technologies and platforms, the system 1400 can overcome numerous technical challenges and includes numerous technical solutions.

One technical solution is that the server 105 can use PWA (Progressive Web Applications), accompanied by developments in cloud servers, to improve accuracy of deep learning models and increased ML algorithm speeds. The detection system 100 can use a CV algorithm with a trained (per task) CNN to locate sub-objects (SO), which can be the test region 130, and analyze them in real-time to meet specific diagnostic task requirements.

Another technical solution of the system 1400 is managing the SDK with different API calls and supporting a dynamically guided user-friendly application/interface. Another technical solution of the system 1400 is developing a user-side ML model for fast and efficient data compression and minimization for improved socket to the cloud server communication. Another technical solution of the system 1400 is developing a computer vision technique of a deep learning module as a MAS (Multi Agent System) with MNN architecture that combines CNNs, RNN's and NNs for the different tasks and managing and manipulating them to support multiple models. Another technical solution of the system 1400 is developing efficient training protocols for the different CNN models using data gathering and annotations to enhance model training. Another technical solution of the system 1400 is developing a responsive application for a "real time" user experience. Yet another technical solution of the system 1400 is connecting to different clients (HMO etc.) with minimal perturbation. Another technical solution of the system 1400 is quality management to optimize and maintain test specificity and sensitivity. Another technical solution of the system 1400 is approving these tools for clinical use through the different regulatory authorities.

Another technical solution of the system 1400 is the display application 120, which reduces the need to install complex apps on mobile devices. Another technical solution of the system 1400 is creating the display application 120 as a secure web app with a user-friendly UX/UI to access the camera 115. Another technical solution of the system 1400 is improving the overall UX/UI of the application through live guidance of the VR model that communicates with the AI model's. Another technical solution of the system 1400 is that the display application 120 can be easily deployed and used on any smart client device 110.

Another technical solution of the system 1400 is reduce the need for image capture by the client device 125, which can overcome issues relating to proper positioning of the camera 115 for effective image capture. Another technical solution of the system 1400 is that security can be established between the server 105 and the client device 110 through gateway connectivity to a secure and different backend server/proxy.

Another technical solution of the system 1400 is increased test accuracy by using deep learning AI algorithms over applications that employ only deep learning models. Another technical solution of the system 1400 reduces the need of modeling each test shape and makes it easy to recognize complex geometric shapes. Another technical solution of the system 1400 is increased adaptive diagnostic test accuracy over time with the ability to obtain semi-quantitative or even quantitative test results. Another technical solution of the system 1400 is supporting multiple users with live streaming through a Linux cloud-based server application. Another technical solution of the system 1400 is that switching between the task(s), Object(s), and/or SO(s) is simplified.

Figure 16:
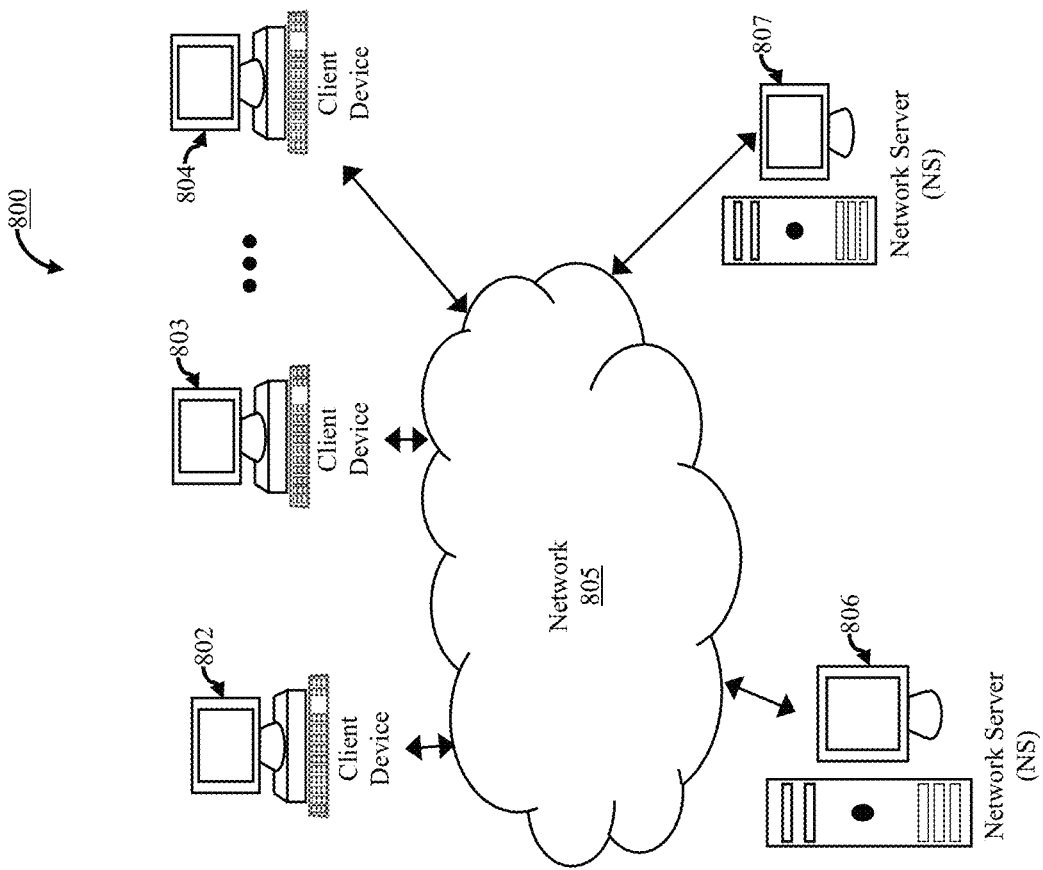

FIG. 16 depicts a block diagram of a computer-based system and platform 800 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 800 may be configured to manage a large number of clients and concurrent transactions, as detailed herein. In some embodiments, the exemplary computer-based system and platform 800 may be based on a scalable computer and network architecture that incorporates various strategies for assessing the data, caching, searching, and/or database connection pooling. An example of the scalable architecture is an architecture that is capable of operating multiple servers.

In some embodiments, referring to FIG. 16, member computing device 802, member computing device 803 through member computing device 804 (e.g., clients) of the exemplary computer-based system and platform 800 may include virtually any computing device capable of receiving and sending a message over a network (e.g., cloud network), such as network 805, to and from another computing device, such as servers 806 and 807, each other, and the like. In some embodiments, the member devices 802-804 may be personal computers, multiprocessor systems, microprocessor-based or programmable consumer electronics, network PCs, and the like. In some embodiments, one or more member devices within member devices 802-804 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 802-804 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), AR glasses/lens, and/or any other device that is equipped to communicate over a wired and/or wireless communication medium (e.g., NFC, RFID, NBIOT, 3G, 4G, 5G, GSM, GPRS, WiFi, WiMax, CDMA, satellite, Bluetooth, ZigBee, etc.).

In some embodiments, one or more member devices within member devices 802-804 may run one or more applications, such as Internet browsers, mobile applications, voice calls, video games, videoconferencing, and email, among others. In some embodiments, one or more member devices within member devices 802-804 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 802-804 may be specifically programmed by either Java, Python .Net, QT, C, C++ and/or other suitable programming language. In some embodiments, one or more member devices within member devices 802-804 may be specifically programmed to include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 805 may provide network access, data transport and/or other services to any computing device coupled to it. In some embodiments, the exemplary network 805 may include and implement at least one specialized network architecture that may be based, at least in part, on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 805 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 805 may include and implement, as an alternative or in conjunction with one or more of the above, a WiMAX architecture defined by the WiMAX forum. In some embodiments and, optionally, in combination of any embodiment described above or below, the exemplary network 805 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 805 may be transmitted based at least in part on one of more communication modes such as, but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 805 may also include mass storage, such as network attached storage (NAS), a storage area network (SAN), a content delivery network (CDN) or other forms of computer or machine-readable media.

In some embodiments, the exemplary server 806 or the exemplary server 807 may be a web server (or a series of servers) running a network operating system, examples of which may include but are not limited to Microsoft Windows Server, Novell NetWare, or Linux. In some embodiments, the exemplary server 806 or the exemplary server 807 may be used for and/or provide cloud and/or network computing. Although not shown in FIG. 16, in some embodiments, the exemplary server 806 or the exemplary server 807 may have connections to external systems like email, SMS messaging, text messaging, ad content providers, etc. Any of the features of the exemplary server 806 may be also implemented in the exemplary server 807 and vice versa.

In some embodiments, one or more of the exemplary servers 806 and 807 may be specifically programmed to perform, in a non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 801-804.

In some embodiments and, optionally, in combination of any embodiment described above or below, for example, one or more exemplary computing member devices 802-804, the exemplary server 806, and/or the exemplary server 807 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. It will be understood that various changes may be made in the function and arrangement of elements without departing from the spirit and scope of the presently disclosed embodiments. Embodiment examples are described as follows with reference to the figures. Identical, similar, or identically acting elements in the various figures are identified with identical reference numbers and a repeated description of these elements is omitted in part to avoid redundancies.

From the foregoing description, it will be apparent that variations and modifications may be made to the embodiments of the present disclosure to adopt it to various usages and conditions. Such embodiments are also within the scope of the following claims.

The recitation of a listing of elements in any definition of a variable herein includes definitions of that variable as any single element or combination (or sub-combination) of listed elements. The recitation of an embodiment herein includes that embodiment as any single embodiment or in combination with any other embodiments or portions thereof

The invention claimed is:

1. A method comprising:
receiving, by a processor, from a camera, a first image stream of a test device, the test device comprising a test region displaying a visual indicator;
applying, by the processor, at least one computer vision technique of a deep learning module to:
identify a plurality of device features of the test device in the first image stream; and
classify, based on the plurality of device features of the test device, at least one first image in the first image stream to at least one first reference image in a corpus of reference images of the test device;
selecting, by the processor, based on the at least one first reference image, at least one imaging directing command for the camera to capture a second image stream, wherein the second image stream includes the test region;
instructing, by the processor, to implement the at least one imaging directing command to automatically generate the second image stream;
receiving, by the processor, the second image stream from the camera adjusted with the at least one imaging directing command;
applying, by the processor, the computer vision technique of the deep learning module to:
identify a plurality of device features of the test region in the second image stream; and
classify, based on the plurality of device features of the test region, at least one second image in the second image stream to at least one second reference image in a corpus of reference images of the test region; and
identifying, by the processor, based on the at least one second reference image, a test result based on the visual indicator in the at least one second image.

2. The method of claim 1, further comprising:
transmitting, by the processor, a user identification to a user device comprising the camera;
maintaining, by the processor, a connection to the user device based on the user identification; and
receiving, by the processor, the first image stream and the second image stream via the connection.

3. The method of claim 1, wherein the plurality of device features is a structural feature.

4. The method of claim 1, wherein the at least one computer vision technique of the deep learning module comprises at least one modular neural network receiving inputs from at least one convolutional neural network.

5. The method of claim 4, wherein the at least one convolutional neural network generates the inputs to identify the test region in the at least one first image in the first image stream.

6. The method of claim 4, wherein the at least one computer vision technique of the deep learning module identifies at least one candidate imaging directing command; and
wherein the at least one convolutional neural network selects the at least one imaging directing command of the at least one candidate imaging directing command.

7. The method of claim 1, further comprising:
generating, by the processor, based on imaging directing metadata associated with the at least one first reference image, the at least one imaging directing command for the camera to capture the second image stream, wherein the second image stream includes the test region.

8. The method of claim 1, wherein instructing to implement the at least one imaging directing command comprises:
transmitting, by the processor, the at least one imaging directing command to the camera to cause the camera to automatically generate the second image stream based on the at least one imaging directing command.

9. The method of claim 1, wherein instructing to implement the at least one imaging directing command comprises:

transmitting, by the processor, to a user device comprising the camera, the at least one imaging directing command comprising augmented reality instructions for the user device to overlay on the first image stream to direct a user to reposition the camera to capture the test device.

10. The method of claim 1, further comprising:
storing, by the processor, the test result; and
transmitting, by the processor, to an administrator device, the test result for display.

11. A system comprising:
a processor configured to:
receive a first image stream of a test device from a camera, the test device comprising a test region displaying a visual indicator;
apply at least one computer vision technique of a deep learning module to:
identify a plurality of device features of the test device in the first image stream; and
classify, based on the plurality of device features of the test device, at least one first image in the first image stream to at least one first reference image in a corpus of reference images of the test device;
select, based on the at least one first reference image, at least one imaging directing command for the camera to capture a second image stream, wherein the second image stream includes the test region;
instruct to implement the at least one imaging directing command to automatically generate the second image stream;
receive the second image stream from the camera adjusted with the at least one imaging directing command;
apply the at least one computer vision technique of the deep learning module to:
identify a plurality of device features of the test region in the second image stream; and
classify, based on the plurality of device features of the test region, at least one second image in the second image stream to at least one second reference image in a corpus of reference images of the test region; and
identify, based on the at least one second reference image, a test result based on the visual indicator in the at least one second image.

12. The system of claim 11, wherein the processor is further configured to:
transmit a user identification to a user device comprising the camera;
maintain a connection to the user device based on the user identification; and
receive the first image stream and the second image stream via the connection.

13. The system of claim 11, wherein the plurality of device features is a structural feature.

14. The system of claim 11, wherein the at least one computer vision technique of the deep learning module comprises at least one modular neural network receiving inputs from at least one convolutional neural network.

15. The system of claim 14, wherein the at least one convolutional neural network generates the inputs to identify the test region in the at least one first image in the first image stream.

16. The system of claim 14, wherein the at least one computer vision technique of the deep learning module identifies at least one candidate imaging directing command; and
wherein the at least one convolutional neural network selects the at least one imaging directing command of the at least one candidate imaging directing command.

17. The system of claim 11, wherein the processor is further configured to:
generate, based on imaging directing metadata associated with the at least one second reference image, the at least one imaging directing command for the camera to capture the second image stream, wherein the second image stream includes the test region.

18. The system of claim 11, wherein to instruct to implement the at least one imaging directing command, the processor is further configured to:
transmit the at least one imaging directing command to the camera to cause the camera to automatically generate the second image stream based on the at least one imaging directing command.

19. The system of claim 11, wherein to instruct to implement the at least one imaging directing command, the processor is further configured to:
transmit, to a user device comprising the camera, the at least one imaging directing command comprising augmented reality instructions for the user device to overlay on the first image stream to direct a user to reposition the camera to capture the test device.

20. The system of claim 11, wherein the processor is further configured to:
store the test result; and
transmit, to an administrator device, the test result for display.

21. A method comprising:
identifying, by a processor of a user device, from a camera of the user device, a first image stream of a test device, the test device comprising a test region displaying a visual indicator;
applying, by the processor, at least one computer vision technique of a deep learning module to:
identify a plurality of device features of the test device in the first image stream;
transmit, to a server comprising a corpus of reference images of the test device, the plurality of device features of the test device;
receive, from the server, at least one first reference image in the corpus of reference images; and
classify, based on the plurality of device features, at least one first image in the first image stream to the at least one first reference image;
selecting, by the processor, based on the at least one first reference image, at least one imaging directing command for the camera to capture a second image stream, wherein the second image stream includes the test region;
instructing, by the processor, to implement the at least one imaging directing command to automatically generate the second image stream;
identifying, by the processor, the second image stream from the camera adjusted with the at least one imaging directing command;
applying, by the processor, the at least one computer vision technique of the deep learning module to:
identify a plurality of device features of the test region in the second image stream;
transmit, to the server comprising a corpus of reference images of the test region, the plurality of device features of the test region;
receive, from the server, at least one second reference image in the corpus of reference images of the test region; and classify, based on the plurality of device features of the test region, at least one second image in the second image stream to the at least one second reference image; and identifying, by the processor, based on the at least one second reference image, a test result based on the visual indicator in the at least one second image.

22. The method of claim 21, further comprising:

receiving, by the processor, a user identification from the server;

maintaining, by the processor, a connection to the server based on the user identification; and transmitting, by the processor, to the server via the connection, the plurality of device features of the test device and the plurality of device features of the test region.

23. The method of claim 21, wherein the plurality of device features is a structural feature.

24. The method of claim 21, wherein the at least one computer vision technique of the deep learning module comprises at least one modular neural network receiving inputs from at least one convolutional neural network.

25. The method of claim 24, wherein the at least one convolutional neural network generates the inputs identifying the test region in the at least one first image in the first image stream.

26. The method of claim 24, wherein the at least one computer vision technique of the deep learning module identifies at least one candidate imaging directing command; and wherein the at least one convolutional neural network selects the at least one imaging directing command of the at least one candidate imaging directing command.

27. The method of claim 21, further comprising:

receiving, by the processor, from the server, imaging directing metadata associated with the at least one second reference image; and generating, by the processor, based on the imaging directing metadata associated with the at least one second reference image, the at least one imaging directing command for the camera to capture the second image stream, wherein the second image stream includes the test region.

28. The method of claim 21, wherein instructing to implement the at least one imaging directing command comprises:

generating, by the processor, the at least one imaging directing command for the camera to automatically generate the second image stream based on the at least one imaging directing command.

29. The method of claim 21, wherein instructing to implement the at least one imaging directing command comprises:

causing, by the processor, the user device to display the at least one imaging directing command comprising augmented reality instructions overlaid on the first image stream to direct a user to reposition the camera to capture the test device.

30. The method of claim 21, further comprising:

storing, by the processor, the test result; and transmitting, by the processor, to an administrator device, the test result for display.

* * * * *